US012207250B2

(12) United States Patent
Chen et al.

(10) Patent No.: US 12,207,250 B2
(45) Date of Patent: Jan. 21, 2025

(54) TIME GAP ENHANCEMENT FOR MESSAGE REPETITION

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 17/672,513

(22) Filed: Feb. 15, 2022

(65) Prior Publication Data

US 2022/0312447 A1 Sep. 29, 2022

Related U.S. Application Data

(60) Provisional application No. 63/166,132, filed on Mar. 25, 2021.

(51) Int. Cl.
*H04W 72/1268* (2023.01)
*H04L 1/08* (2006.01)
(Continued)

(52) U.S. Cl.
CPC ........... *H04W 72/1268* (2013.01); *H04L 1/08* (2013.01); *H04W 72/0446* (2013.01); *H04W 72/20* (2023.01)

(58) Field of Classification Search
CPC ....... H04L 1/08; H04L 1/1864; H04L 1/1887; H04L 1/189; H04W 72/0446; H04W 72/1268; H04W 72/20; H04W 72/23
See application file for complete search history.

(56) References Cited

U.S. PATENT DOCUMENTS 11,050,525 B2 * 6/2021 Vilaipornsawai ......... H04L 1/08
11,723,052 B2 * 8/2023 Deghel ................ H04B 7/0695
370/329
(Continued)

FOREIGN PATENT DOCUMENTS

CA 3114263 A1 * 4/2020 ........... H04B 7/0408
CA 3114263 C * 10/2023 ........... H04B 7/0408
(Continued)

OTHER PUBLICATIONS

International Search Report and Written Opinion—PCT/US2022/016547—ISA/EPO—May 10, 2022.
(Continued)

*Primary Examiner* — Eric Nowlin
(74) *Attorney, Agent, or Firm* — Holland & Hart LLP

(57) ABSTRACT

Methods, systems, and devices for wireless communication are described. A UE may receive control signaling scheduling transmission of a plurality of repetitions of an uplink message and indicating a time gap threshold between at least one pair of adjacent repetitions. The UE may transmit a first repetition of the uplink message based at least in part on the control signaling. The UE may transmit, based on the control signaling, a second repetition of the uplink message separated in time from transmission of the first repetition of the uplink message by a time gap satisfying the time gap threshold.

28 Claims, 19 Drawing Sheets

(51) Int. Cl.
*H04W 72/0446* (2023.01)
*H04W 72/20* (2023.01)

(56) References Cited

U.S. PATENT DOCUMENTS

| | | | |
|---|---|---|---|
| 12,003,452 B2 * | 6/2024 | Zhang | H04W 72/1268 |
| 2020/0022144 A1 * | 1/2020 | Papasakellariou | H04W 72/23 |
| 2020/0106559 A1 * | 4/2020 | Vilaipornsawai | H04L 1/1896 |
| 2022/0256531 A1 * | 8/2022 | Sridharan | H04L 1/08 |
| 2022/0303097 A1 * | 9/2022 | Zhang | H04B 7/024 |
| 2022/0322357 A1 * | 10/2022 | Deghel | H04W 72/1263 |
| 2022/0322412 A1 * | 10/2022 | Taherzadeh Boroujeni | H04W 72/23 |
| 2022/0369243 A1 * | 11/2022 | Chen | H04L 5/0051 |
| 2022/0400471 A1 * | 12/2022 | Hu | H04L 5/0048 |
| 2023/0224874 A1 * | 7/2023 | Lin | H04L 5/0094 370/336 |
| 2023/0292312 A1 * | 9/2023 | Khoshnevisan | H04L 1/189 |
| 2023/0354314 A1 * | 11/2023 | Ma | H04L 5/0053 |
| 2023/0361946 A1 * | 11/2023 | Li | H04B 7/0695 |
| 2024/0015704 A1 * | 1/2024 | Niu | H04W 72/0446 |

FOREIGN PATENT DOCUMENTS

| | | | | |
|---|---|---|---|---|
| CN | 112715011 A | * | 4/2021 | H04B 7/0408 |
| CN | 112715011 B | * | 10/2022 | H04B 7/0408 |
| JP | 2023545319 A | | 10/2023 | |
| WO | WO-2020013559 A1 | * | 1/2020 | H04L 5/0044 |
| WO | WO-2023082210 A1 | * | 5/2023 | H04L 1/08 |
| WO | WO-2023212434 A1 | * | 11/2023 | H04L 1/08 |
| WO | WO-2024086428 A1 | * | 4/2024 | H04L 1/08 |

OTHER PUBLICATIONS

Moderator (Nokia), et al., "Summary of Multi-TRP for PUCCH and PUSCH", R1-2101784, 3GPP TSG RAN WG1 #104-e, 3GPP Draft, R1-2101784, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 26, 2021 (Jan. 26, 2021), XP051975886, 61 Pages, Retrieved from the Internet: URL: https://ftp.3gpp.org/tsg_ran/WG1_RL1/TSGR1_104-e/Docs/R1-2101784.zip R1-2101784.docx [retrieved on Jan. 26, 2021] p. 48-p. 50.

* cited by examiner

TIME GAP ENHANCEMENT FOR MESSAGE REPETITION

CROSS REFERENCE

The present application for patent claims the benefit of U.S. Provisional Patent Application No. 63/166,132 by CHEN et al., entitled "TIME GAP ENHANCEMENT FOR MESSAGE REPETITION," filed Mar. 25, 2021, assigned to the assignee hereof, and expressly incorporated by reference herein.

FIELD OF TECHNOLOGY

The following relates to wireless communication, including time gap enhancement for message repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may repeat transmissions to increase reliability. As part of such a procedure, the UE may maintain an amount of time between transmissions to reconfigure parameters for the repetitions. Conventional methods for repetition of transmissions may be deficient.

SUMMARY

The described techniques relate to improved methods, systems, devices, and apparatuses that support time gap enhancement for message repetition. Generally, the described techniques provide for methods for repetition of transmissions. A user equipment (UE) may receive control signaling (e.g., radio resource control (RRC) signaling or downlink control information (DCI)) that may schedule transmission of a plurality of repetitions of an uplink message (e.g., repeated transmission of a same message on a physical uplink shared channel (PUSCH) or other message) and may also indicate a time gap threshold between a pair of adjacent repetitions. The UE may transmit a first repetition of the uplink message based on the control signaling. The UE may also transmit, based on the control signaling, a second repetition of the uplink message separated in time from transmission of the first repetition by a time gap that may satisfy the time gap threshold.

A method for wireless communication at a UE is described. The method may include receiving control signaling scheduling transmission of a set of multiple repetitions of an uplink message and indicating a time gap threshold between at least one pair of adjacent repetitions, transmitting a first repetition of the uplink message based on the control signaling, and transmitting, based on the control signaling, a second repetition of the uplink message separated in time from transmission of the first repetition of the uplink message by a time gap satisfying the time gap threshold.

An apparatus for wireless communication at a UE is described. The apparatus may include a processor, memory coupled with the processor, and instructions stored in the memory. The instructions may be executable by the processor to cause the apparatus to receive control signaling scheduling transmission of a set of multiple repetitions of an uplink message and indicating a time gap threshold between at least one pair of adjacent repetitions, transmit a first repetition of the uplink message based on the control signaling, and transmit, based on the control signaling, a second repetition of the uplink message separated in time from transmission of the first repetition of the uplink message by a time gap satisfying the time gap threshold.

Another apparatus for wireless communication at a UE is described. The apparatus may include means for receiving control signaling scheduling transmission of a set of multiple repetitions of an uplink message and indicating a time gap threshold between at least one pair of adjacent repetitions, means for transmitting a first repetition of the uplink message based on the control signaling, and means for transmitting, based on the control signaling, a second repetition of the uplink message separated in time from transmission of the first repetition of the uplink message by a time gap satisfying the time gap threshold.

A non-transitory computer-readable medium storing code for wireless communication at a UE is described. The code may include instructions executable by a processor to receive control signaling scheduling transmission of a set of multiple repetitions of an uplink message and indicating a time gap threshold between at least one pair of adjacent repetitions, transmit a first repetition of the uplink message based on the control signaling, and transmit, based on the control signaling, a second repetition of the uplink message separated in time from transmission of the first repetition of the uplink message by a time gap satisfying the time gap threshold.

In some examples of the method, apparatuses, and non-transitory computer-readable medium described herein, transmitting the first and second repetitions of the uplink message may include operations, features, means, or instructions for transmitting one or more repetitions of the uplink message having the time gap between one or more pairs of consecutive repetitions of the plurality of repetitions.

In some examples of the method, apparatuses, and non-transitory computer-readable medium described herein, transmitting the second repetition of the uplink message may include operations, features, means, or instructions for transmitting the second repetition of the uplink message separated in time from transmission of the first repetition of the uplink message by the time gap based on a first transmission parameter configured for transmission of the first repetition of the uplink message differing from a second transmission parameter configured for transmission of the second repetition of the uplink message.

In some examples of the method, apparatuses, and non-transitory computer-readable medium described herein, receiving the control signaling may include operations, features, means, or instructions for receiving the control signaling indicating the first transmission parameter that specifies a first uplink transmission beam for transmission of the first repetition of the uplink message and the second transmission parameter that specifies a second uplink transmission beam for transmission of the second repetition of the uplink message that differs from the first uplink transmission beam.

In some examples of the method, apparatuses, and non-transitory computer-readable medium described herein, receiving the control signaling may include operations, features, means, or instructions for receiving the control signaling indicating the first transmission parameter that specifies a first precoding indication for transmission of the first repetition of the uplink message and the second transmission parameter that specifies a second precoding indication for transmission of the second repetition of the uplink message that differs from the first precoding indication.

In some examples of the method, apparatuses, and non-transitory computer-readable medium described herein, receiving the control signaling may include operations, features, means, or instructions for receiving the control signaling indicating the first transmission parameter that specifies a first power control parameter for transmission of the first repetition of the uplink message and the second transmission parameter that specifies a second power control parameter for transmission of the second repetition of the uplink message that differs from the first power control parameter.

In some examples of the method, apparatuses, and non-transitory computer-readable medium described herein, transmitting the first repetition of the uplink message may include operations, features, means, or instructions for transmitting the first repetition of the uplink message within a first subset of resources indicated by the control signaling for the first repetition, where the time gap corresponds to a second subset of resources indicated by the control signaling for the first repetition.

In some examples of the method, apparatuses, and non-transitory computer-readable medium described herein, transmitting the first repetition of the uplink message may include operations, features, means, or instructions for transmitting the first repetition of the uplink message within a first subset of resources indicated by the control signaling for the first repetition based on invalidating one or more symbols within a second subset of resources indicated by the control signaling for the first repetition corresponding to the time gap threshold.

In some examples of the method, apparatuses, and non-transitory computer-readable medium described herein, transmitting the second repetition of the uplink message may include operations, features, means, or instructions for transmitting the second repetition of the uplink message within a first subset of resources indicated by the control signaling for the second repetition, where the time gap corresponds to a second subset of resources indicated by the control signaling for the second repetition.

In some examples of the method, apparatuses, and non-transitory computer-readable medium described herein, transmitting the second repetition of the uplink message may include operations, features, means, or instructions for transmitting the second repetition of the uplink message within a first subset of resources indicated by the control signaling for the second repetition based on invalidating one or more symbols within a second subset of resources indicated by the control signaling for the second repetition corresponding to the time gap threshold.

Some examples of the method, apparatuses, and non-transitory computer-readable medium described herein may further include operations, features, means, or instructions for transmitting the first repetition includes transmitting the first repetition of the uplink message within a first subset of resources indicated by the control signaling for the first repetition based on invalidating one or more symbols within a second subset of resources indicated by the control signaling for the first repetition corresponding to the time gap threshold and transmitting the second repetition includes transmitting the second repetition of the uplink message within a first subset of resources indicated by the control signaling for the second repetition based on invalidating one or more symbols within a second subset of resources indicated by the control signaling for the second repetition corresponding to the time gap threshold.

In some examples of the method, apparatuses, and non-transitory computer-readable medium described herein, each uplink message repetition may be associated with a corresponding transmission parameter.

In some examples of the method, apparatuses, and non-transitory computer-readable medium described herein, the first repetition may be a first sub-repetition of a third repetition of the set of multiple repetitions and the second repetition may be a second sub-repetition of the third repetition.

In some examples of the method, apparatuses, and non-transitory computer-readable medium described herein, where the first sub-repetition may be a first actual repetition and the second sub-repetition may be a second actual repetition.

In some examples of the method, apparatuses, and non-transitory computer-readable medium described herein, transmitting the first sub-repetition of the uplink message may include operations, features, means, or instructions for identifying a configured gap between the first sub-repetition and the second sub-repetition and transmitting the first sub-repetition of the uplink message within a first subset of resources indicated by the control signaling for the first sub-repetition based on the configured gap and invalidating one or more symbols within a second subset of resources indicated by the control signaling for the first sub-repetition corresponding to the time gap threshold.

In some examples of the method, apparatuses, and non-transitory computer-readable medium described herein, transmitting the second sub-repetition of the uplink message may include operations, features, means, or instructions for identifying a configured gap between the first sub-repetition and the second sub-repetition and transmitting the second sub-repetition of the uplink message within a first subset of resources indicated by the control signaling for the second sub-repetition based on the configured gap and invalidating one or more symbols within a second subset of resources indicated by the control signaling for the second sub-repetition corresponding to the time gap threshold.

Some examples of the method, apparatuses, and non-transitory computer-readable medium described herein may further include operations, features, means, or instructions for transmitting the first repetition includes transmitting the first repetition of the uplink message within a first subset of resources indicated by the control signaling for the first repetition based on the first subset of resources indicated by the control signaling for the first repetition crossing a slot boundary and transmitting the second repetition includes transmitting the second repetition of the uplink message within a second subset of resources indicated by the control signaling for the first repetition that occurs after the slot boundary.

Some examples of the method, apparatuses, and non-transitory computer-readable medium described herein may further include operations, features, means, or instructions for determining that the first repetition may be a first sub-repetition and that the second repetition may be a second sub-repetition and where transmitting the first repetition and the second repetition includes transmitting the first sub-repetition, the second sub-repetition, or both, on a first subset and a second subset of resources indicated by the control signaling for the set of multiple repetitions, the first subset of resources separated in time by the time gap from the second subset of resources.

In some examples of the method, apparatuses, and non-transitory computer-readable medium described herein, the first repetition may be a first nominal repetition and the second repetition may be a second nominal repetition.

In some examples of the method, apparatuses, and non-transitory computer-readable medium described herein, receiving the control signaling may include operations, features, means, or instructions for receiving a first control message scheduling the set of multiple repetitions of the uplink message and a second control message indicating the time gap threshold.

In some examples of the method, apparatuses, and non-transitory computer-readable medium described herein, the control signaling includes radio resource control signaling.

In some examples of the method, apparatuses, and non-transitory computer-readable medium described herein, the control signaling includes downlink control information.

A method for wireless communication at a network device is described. The method may include transmitting control signaling scheduling transmission of a set of multiple repetitions of an uplink message and indicating a time gap threshold between at least one pair of adjacent repetitions, receiving a first repetition of the uplink message based on the control signaling, and receiving, based on the control signaling, a second repetition of the uplink message separated in time from transmission of the first repetition of the uplink message by a time gap satisfying to the time gap threshold.

An apparatus for wireless communication at a network device is described. The apparatus may include a processor, memory coupled with the processor, and instructions stored in the memory. The instructions may be executable by the processor to cause the apparatus to transmit control signaling scheduling transmission of a set of multiple repetitions of an uplink message and indicating a time gap threshold between at least one pair of adjacent repetitions, receive a first repetition of the uplink message based on the control signaling, and receive, based on the control signaling, a second repetition of the uplink message separated in time from transmission of the first repetition of the uplink message by a time gap satisfying to the time gap threshold.

Another apparatus for wireless communication at a network device is described. The apparatus may include means for transmitting control signaling scheduling transmission of a set of multiple repetitions of an uplink message and indicating a time gap threshold between at least one pair of adjacent repetitions, means for receiving a first repetition of the uplink message based on the control signaling, and means for receiving, based on the control signaling, a second repetition of the uplink message separated in time from transmission of the first repetition of the uplink message by a time gap satisfying to the time gap threshold.

A non-transitory computer-readable medium storing code for wireless communication at a network device is described. The code may include instructions executable by a processor to transmit control signaling scheduling transmission of a set of multiple repetitions of an uplink message and indicating a time gap threshold between at least one pair of adjacent repetitions, receive a first repetition of the uplink message based on the control signaling, and receive, based on the control signaling, a second repetition of the uplink message separated in time from transmission of the first repetition of the uplink message by a time gap satisfying to the time gap threshold.

In some examples of the method, apparatuses, and non-transitory computer-readable medium described herein, receiving the first and second repetitions of the uplink message may include operations, features, means, or instructions for receiving one or more repetitions of the uplink message having the time gap between one or more pairs of consecutive repetitions of the plurality of repetitions.

In some examples of the method, apparatuses, and non-transitory computer-readable medium described herein, receiving the second repetition of the uplink message may include operations, features, means, or instructions for receiving the second repetition of the uplink message separated in time from reception of the first repetition of the uplink message by the time gap based on a first transmission parameter configured for transmission of the first repetition of the uplink message differing from a second transmission parameter configured for transmission of the second repetition of the uplink message.

In some examples of the method, apparatuses, and non-transitory computer-readable medium described herein, transmitting the control signaling may include operations, features, means, or instructions for transmitting the control signaling indicating the first transmission parameter that specifies a first uplink transmission beam for transmission of the first repetition of the uplink message and the second transmission parameter that specifies a second uplink transmission beam for transmission of the second repetition of the uplink message that differs from the first uplink transmission beam.

In some examples of the method, apparatuses, and non-transitory computer-readable medium described herein, transmitting the control signaling may include operations, features, means, or instructions for transmitting the control signaling indicating the first transmission parameter that specifies a first precoding indication for transmission of the first repetition of the uplink message and the second transmission parameter that specifies a second precoding indication for transmission of the second repetition of the uplink message that differs from the first precoding indication.

In some examples of the method, apparatuses, and non-transitory computer-readable medium described herein, transmitting the control signaling may include operations, features, means, or instructions for transmitting the control signaling indicating the first transmission parameter that specifies a first power control parameter for transmission of the first repetition of the uplink message and the second transmission parameter that specifies a second power control parameter for transmission of the second repetition of the uplink message that differs from the first power control parameter.

In some examples of the method, apparatuses, and non-transitory computer-readable medium described herein, receiving the first repetition may include operations, features, means, or instructions for receiving the first repetition of the uplink message within a first subset of resources indicated by the control signaling for the first repetition.

In some examples of the method, apparatuses, and non-transitory computer-readable medium described herein, receiving the first repetition of the uplink message may include operations, features, means, or instructions for receiving the first repetition of the uplink message within a first subset of resources indicated by the control signaling for the first repetition, where the time gap corresponds to a second subset of resources indicated by the control signaling for the first repetition.

In some examples of the method, apparatuses, and non-transitory computer-readable medium described herein, receiving the second repetition may include operations, features, means, or instructions for receiving the second repetition of the uplink message within a first subset of resources indicated by the control signaling for the second repetition.

In some examples of the method, apparatuses, and non-transitory computer-readable medium described herein, receiving the second repetition of the uplink message may include operations, features, means, or instructions for receiving the second repetition of the uplink message within a first subset of resources indicated by the control signaling for the second repetition, where the time gap corresponds to a second subset of resources indicated by the control signaling for the second repetition.

Some examples of the method, apparatuses, and non-transitory computer-readable medium described herein may further include operations, features, means, or instructions for receiving the first repetition includes receiving the first repetition of the uplink message within a first subset of resources indicated by the control signaling for the first repetition and receiving the second repetition includes receiving the second repetition of the uplink message within a first subset of resources indicated by the control signaling for the second repetition.

In some examples of the method, apparatuses, and non-transitory computer-readable medium described herein, each uplink message repetition may be associated with a corresponding transmission parameter.

In some examples of the method, apparatuses, and non-transitory computer-readable medium described herein, the first repetition may be a first sub-repetition of a third repetition of the set of multiple repetitions and the second repetition may be a second sub-repetition of the third repetition.

In some examples of the method, apparatuses, and non-transitory computer-readable medium described herein, where the first sub-repetition may be a first actual repetition and the second sub-repetition may be a second actual repetition.

In some examples of the method, apparatuses, and non-transitory computer-readable medium described herein, receiving the first sub-repetition of the uplink message may include operations, features, means, or instructions for receiving the first sub-repetition of the uplink message within a first subset of resources indicated by the control signaling for the first sub-repetition based on a configured gap between the first sub-repetition and the second sub-repetition.

In some examples of the method, apparatuses, and non-transitory computer-readable medium described herein, receiving the second sub-repetition of the uplink message may include operations, features, means, or instructions for receiving the second sub-repetition of the uplink message within a first subset of resources indicated by the control signaling for the second sub-repetition based on a configured gap between the first sub-repetition and the second sub-repetition.

Some examples of the method, apparatuses, and non-transitory computer-readable medium described herein may further include operations, features, means, or instructions for receiving the first repetition includes receiving the first repetition of the uplink message within a first subset of resources indicated by the control signaling for the first repetition based on the first subset of resources indicated by the control signaling for the first repetition crossing a slot boundary and receiving the second repetition includes receiving the second repetition of the uplink message within a second subset of resources indicated by the control signaling for the first repetition that occurs after the slot boundary.

Some examples of the method, apparatuses, and non-transitory computer-readable medium described herein may further include operations, features, means, or instructions for identifying that the first repetition may be a first sub-repetition and that the second repetition may be a second sub-repetition and where receiving the first repetition and the second repetition includes receiving the first sub-repetition, the second sub-repetition, or both, on a first subset and a second subset of resources indicated by the control signaling for the set of multiple repetitions, the first subset of resources separated in time by the time gap from the second subset of resources.

In some examples of the method, apparatuses, and non-transitory computer-readable medium described herein, the first repetition may be a first nominal repetition and the second repetition may be a second nominal repetition.

In some examples of the method, apparatuses, and non-transitory computer-readable medium described herein, transmitting the control signaling may include operations, features, means, or instructions for transmitting a first control message scheduling the set of multiple repetitions of the uplink message and a second control message indicating the time gap threshold.

In some examples of the method, apparatuses, and non-transitory computer-readable medium described herein, the control signaling includes radio resource control signaling.

In some examples of the method, apparatuses, and non-transitory computer-readable medium described herein, the control signaling includes downlink control information.

DETAILED DESCRIPTION

In some wireless communications it is desirable for a user equipment (UE) to repeat uplink transmissions to increase transmission reliability. In some cases, a UE may transmit a first repetition using one or more first parameters different than one or more second parameters used to transmit a second repetition. After transmitting the first repetition based on the one or more first parameters, the UE may insert a time gap after transmitting the first repetitions to facilitate reconfiguration based on the one or more second parameters to prepare for transmission of the second repetition. However, in some cases, insertion of the time gap of a fixed size between consecutive repetitions may not be needed (e.g., the time gap exceeds the amount of time that the UE needs to reconfigure), and may introduce unnecessary delays between repetitions.

To reduce delays in transmission, a UE may apply a time gap between repetitions based on a time gap threshold that may be configured or dynamically indicated. In some cases, the UE may expand a time gap to meet the time gap threshold by invalidating symbols from the first repetition, the second repetition, or both. In some cases, the UE may apply a time gap between nominal repetitions, and in other cases, the UE may apply a time gap between actual repetitions. In cases of actual repetitions, the enforcement of the time gap may take an existing time gap between actual repetitions into account when invalidating symbols to meet the time gap threshold.

Aspects of the disclosure are initially described in the context of wireless communications systems. Aspects of the disclosure are then illustrated by example repetition schemes, wireless communication systems, and process flows. Aspects of the disclosure are further illustrated by and described with reference to apparatus diagrams, diagrams, and flowcharts that relate to time gap enhancement for message repetition.

Figure 1:
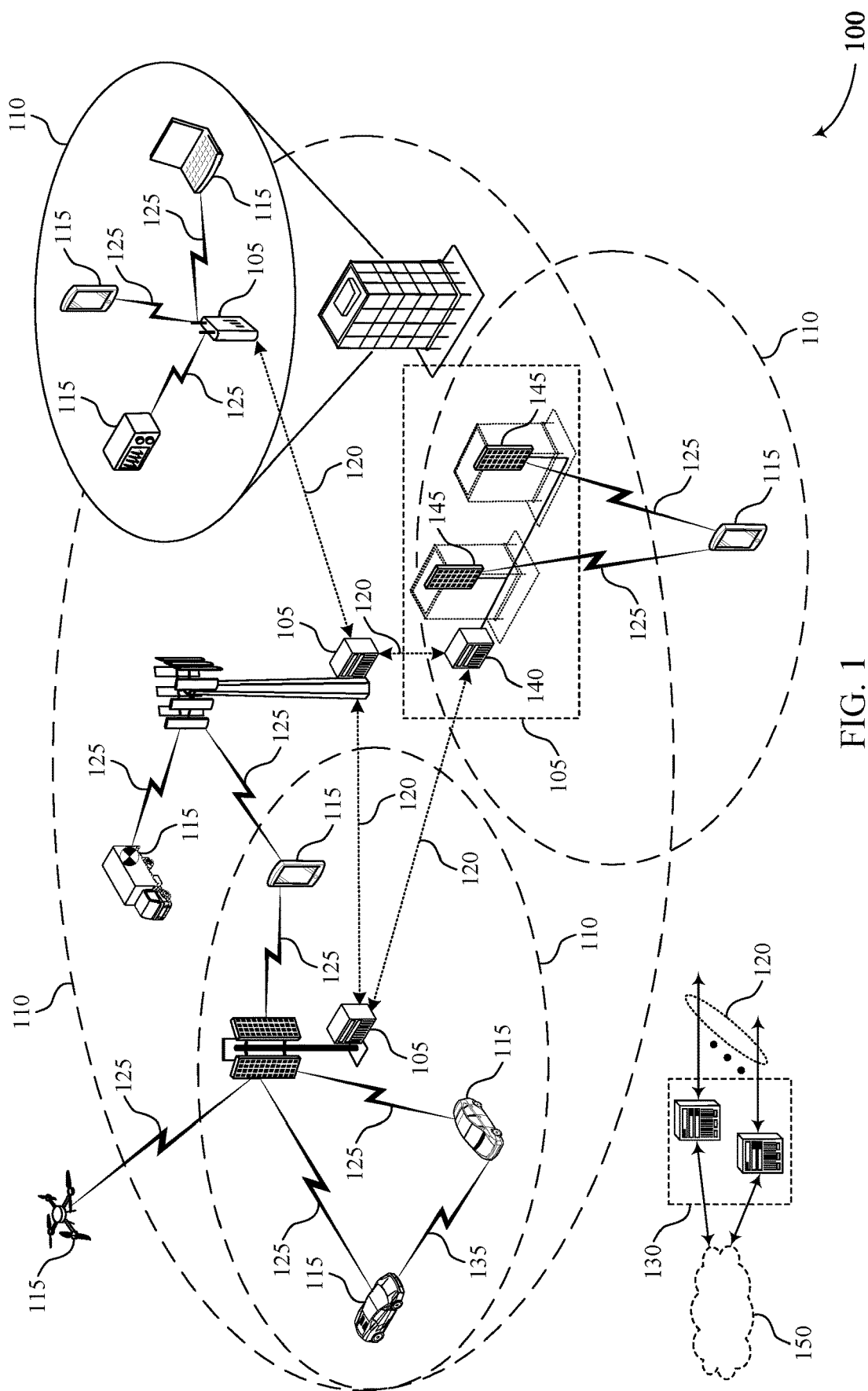
FIG. 1 illustrates an example of a wireless communications system that supports time gap enhancement for message repetition in accordance with examples as disclosed herein.

FIG. 1 illustrates an example of a wireless communications system 100 that supports time gap enhancement for message repetition in accordance with examples as disclosed herein. The wireless communications system 100 may include one or more network devices, base stations 105, one or more UEs 115, and a core network 130. In some examples, the base station 105 may be an example of a network device. Though the base stations 105 may be depicted or discussed herein as examples of network devices, one or more other network devices may be used instead. Such a network device may be a network node, an IAB node, a core network node, a base station, another network device, or any combination thereof. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive control signaling (e.g., radio resource control (RRC) signaling, downlink control information (DCI), or other signaling) from the base station 105, the control signaling scheduling transmission of a plurality of repetitions of an uplink message (e.g., a message transmitted on a physical uplink shared channel (PUSCH)). The control signaling may also indicate a time gap threshold between at least one pair of adjacent repetitions. The UE 115 may transmit a first repetition of the uplink message, and this transmission may be based on the control signaling received by the UE 115. The UE 115 may also transmit, based on the control signaling, a second repetition of the uplink message. In some examples, such a repetition scheme may be a PUSCH repetition type B. In some examples, the second repetition may be separated in time from transmission of the first repetition of the uplink message by a time gap that may satisfy the time gap threshold (e.g., the time gap is at least the same time duration as the time gap threshold). As such, the UE 115 may communicate with the base station 105 using repetitions while reducing transmission delays.

Figure 2A:
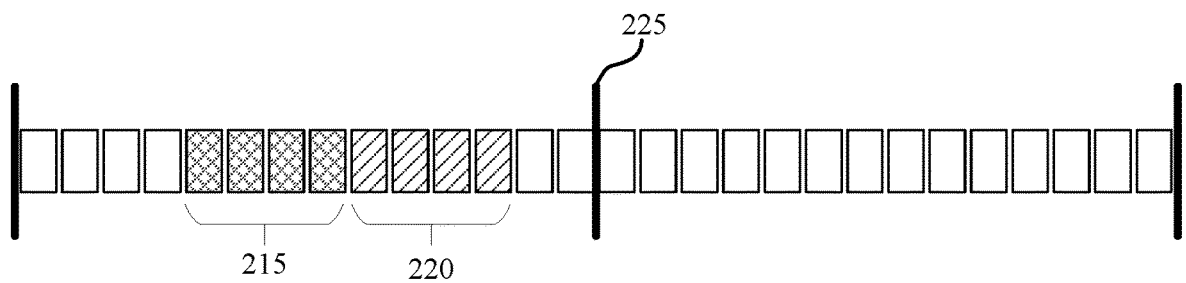
FIGS. 2A and 2B illustrate an example of a repetition scheme that supports time gap enhancement for message repetition in accordance with examples as disclosed herein.
Figure 2A:
Figure 2A:
Figure 2B:
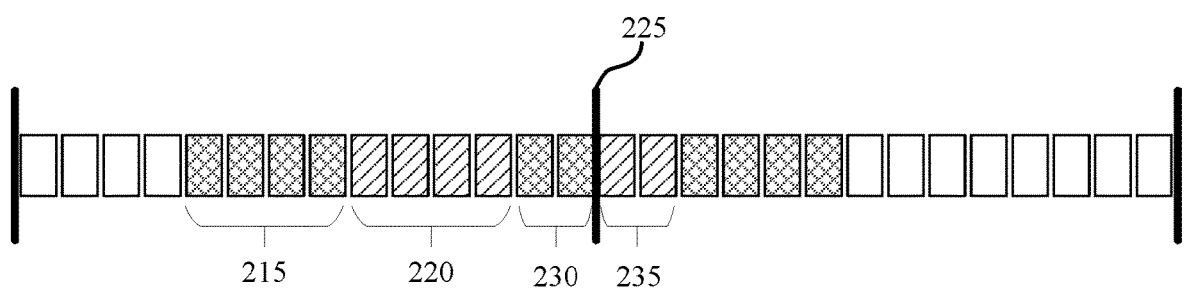
Figure 2B:
Figure 2B:

FIGS. 2A and 2B illustrate examples of repetition scheme 200 that supports time gap enhancement for message in accordance with examples as disclosed herein. In repetition scheme 200, the UE may transmit a first nominal repetition 215 over a set of first parameter symbols 205, and a second nominal repetition 220 over a set of second parameter symbols 210. In some examples, the first parameter symbols 205 may be associated with one or more parameters for transmission of the first parameter symbols 205, and the second parameter symbols 210 may be associated with one or more parameters for transmission of the second parameter symbols 210. In some examples, the UE may transmit the first parameter symbols 205 in a first nominal repetition 215, and the UE may transmit the second parameter symbols 210 in a second nominal repetition 220. In some examples, such nominal repetitions may be indicated in a control message or control signaling (e.g., an RRC message or a DCI message), the nominal repetitions may be consecutive in time, and each may have the same length in time (e.g., same number of symbol periods). Such transmissions may be indicated, allotted, or scheduled in reference to slots, and divisions between slots may be known as a slot boundary 225. In FIG. 2A, the first nominal repetition 215 and the second nominal repetition 220 do not cross the slot boundary 225.

FIG. 2B addresses a case where such nominal repetitions may cross the slot boundary 225. In such a case, if the UE transmits a nominal repetition crossing the slot boundary 225, the nominal repetition may be divided into two actual repetitions. In the example shown in FIG. 2B, a nominal repetition that crossed the slot boundary 225 is divided into a first actual repetition 230 and a second actual repetition 235.

In some repetition schemes, a symbol of one of the repetitions may be identified as an invalid symbol. In such cases, a nominal repetition (e.g., the first nominal repetition 215 and the second nominal repetition 220) may be divided into actual repetitions after removing the invalid symbols. In some cases, a symbol may be designated as invalid for a variety of reasons (e.g., semi-static downlink symbols that cannot be used as an uplink symbol, an indicated symbol in a pattern of invalid symbols, a synchronization symbol/physical broadcast channel (SS/PBCH) block (SSB) symbol, a symbol where a control resource set (CORESET) such as CORESET0 for type0 physical downlink control channel (PDCCH) is monitored, or for other reasons).

Figure 3A:
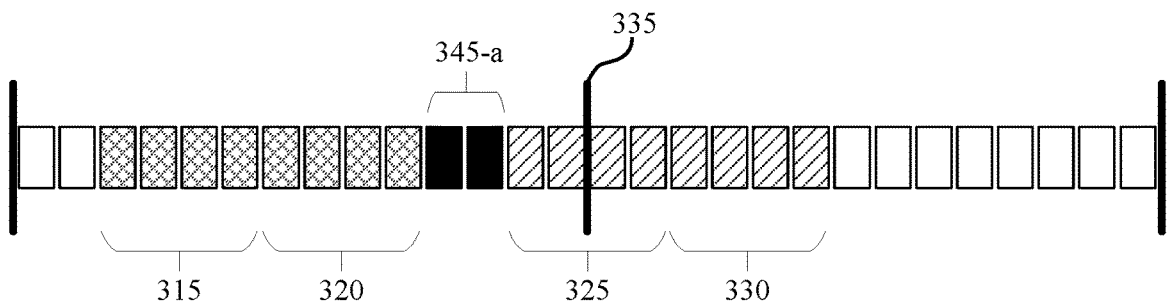
FIGS. 3A and 3B illustrate an example of a repetition scheme that supports time gap enhancement for message repetition in accordance with examples as disclosed herein.
Figure 3B:
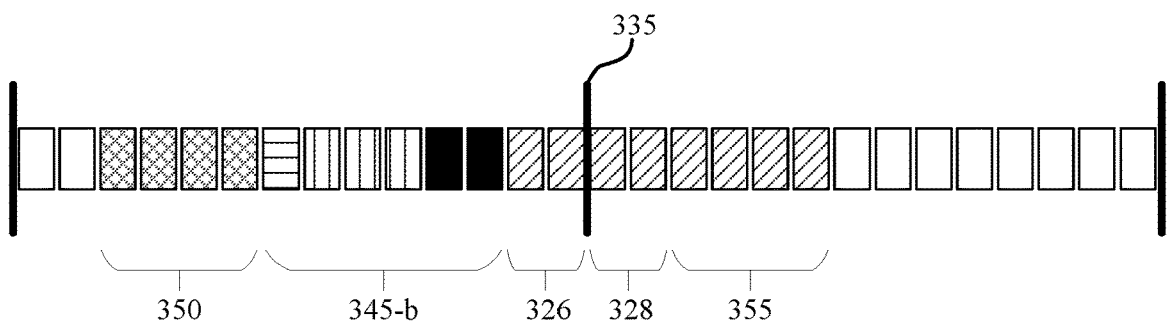

FIGS. 3A and 3B illustrate an example of a repetition scheme 300 that supports time gap enhancement for message repetition in accordance with examples as disclosed herein. In such a repetition scheme 300, the UE may transmit a first nominal repetition 315 over a set of first parameter symbols 305, and a second nominal repetition 320 over a set of second parameter symbols 310. In some examples, the UE may transmit first parameter symbols 305 that may be associated with one or more parameters for transmission of the first parameter symbols 305, and the UE may also transmit second parameter symbols 310 that may be associated with one or more parameters for transmission of the second parameter symbols 310. Such one or more transmission parameters may include different uplink beams, precoding configurations or schemes, uplink power control parameters, or other parameters or configurations. In some examples, the UE may transmit first parameter symbols 305 that may be included in a first nominal repetition 315 and a second nominal repetition 320, and the UE may further transmit second parameter symbols 310 that may be included in a third nominal repetition 325 and a fourth nominal repetition 330. In some examples, a nominal repetition (e.g., the third nominal repetition 325) may cross a slot boundary 335.

In examples where the UE transmits two sets of nominal repetitions (e.g., the first nominal repetition 315 and the second nominal repetition 320 as a first set, and the third nominal repetition 325 and the fourth nominal repetition 330 as a second set), a UE (such as the UE 115 discussed in relation to FIG. 1) may insert a time gap 345-a (represented by the switching gap symbols 340) between sets of nominal repetitions to allow for switching or modification of one or more transmission parameters associated with the first parameter symbols 305 and the second parameter symbols 310. For example, if the UE transmits two successive nominal repetitions, and the UE may transmit the earlier nominal repetition using a first beam, and the later nominal repetition using a second beam different than the first beam, the UE may insert a time gap 345-a between the nominal repetitions because the UE may use an amount of time to switch beams (or another transmission parameter).

In FIG. 3B, another example of repetition scheme 300 is shown, in which the UE may additionally insert a fixed time gap alongside the time gap inserted by the UE as described in relation to FIG. 3A to form the time gap 345-b. In some examples, the first nominal repetition 315 may form a first actual repetition 350, and the third nominal repetition 325 may be divided into a second actual repetition 326 and a third actual repetition 328. In some cases, such a division may occur when a nominal repetition (e.g., the third nominal repetition 325 crosses the slot boundary 335. The fourth nominal repetition 330 may form a fourth actual repetition 355.

In some examples, the UE may receive a DCI that may contain a sounding resource signal (SRS) resource indication (SRI) field. Such a field may indicate one or more resources for SRS. In some examples, each SRS resource may be configured with spatial relation information (e.g., an uplink beam) which may determine a parameter (e.g., a particular uplink beam) to be used for transmission of the SRS resource. In some examples, the same spatial relation may be used for other transmissions (e.g., PUSCH transmissions) when the corresponding SRS resources are indicated (e.g., when indicating SRS resources through the SRI field of a DCI).

In some examples, the UE may also receive an uplink transmission configuration indication (TCI), which may indicate a TCI state (e.g., an uplink beam) to use for transmissions (e.g., PUSCH transmissions). In some cases, the UE may receive a configuration for a repetition scheme (e.g., a time domain multiplexing scheme with different uplink beams), which may be specified by the TCI or by other indications. The UE may receive indications of different spatial relations (e.g., via SRI or TCI) for scheduling of transmissions (e.g., PUSCH transmissions). In some cases, the UE may receive indications of multiple SRIs, or the UE may receive one or more indications of TCI states. In some examples, the TCI states may include patterns that may be configurable. In some examples, the UE may receive indications of transmissions repetitions, that may be intra-slot or inter-slot. Also, the UE may also receive indications of additional parameters. For example, the UE may receive parameters relating to simultaneous multi-beam uplink transmission. Such parameters may indicate the use of FDM (e.g., the use of different RBs) or spatial domain multiplexing (SDM) (e.g., the use of the same set of RBs). In addition, the UE may receive indications of partial overlaps of time or frequency resources. Further, the UE may receive indications of different PUSCHs (e.g., transport blocks) with different beams. Alternatively, or additionally, the UE may receive indications to use the same PUSCH (e.g., transport block) with multiple beams.

In some examples, the UE may be configured through RRC to insert a number of symbols (e.g., OFDM symbols) as a fixed time gap alongside the time gap created by the UE because of a transmission parameter. In some examples, DCI may be used to indicate a number of symbols that the UE should insert alongside the time gap created by the UE because of a transmission parameter. In some cases, the number of symbols that the UE may insert as part or all of the time gap 345-$b$ may be of a fixed size, regardless of the particular configuration, repetitions, or other factors discussed herein. Such a fixed gap may introduce unnecessary transmission delays.

In addition to inserting the switching gap symbols 340 (and in some examples, in accordance with received signaling such as RRC or DCI), the UE may also invalidate symbols or omit repetitions, or both, to enforce the fixed time gap that may be indicated by RRC, DCI, or other methods. For example, the UE may invalidate symbols, creating the invalid symbols 360 shown in FIG. 3B, and may also omit a repetition, creating the omitted repetition 365 shown in FIG. 3B. By doing so, the UE has created a time gap 345-$b$ of a length that may not be necessary and may introduce unnecessary transmission delay. As such, an approach for the UE to control the size of the time gap 345-$b$ between adjacent repetitions is needed. In such an approach, the UE may include a time gap that satisfies the gap threshold, while at the same time avoiding unneeded latency.

Figure 4:
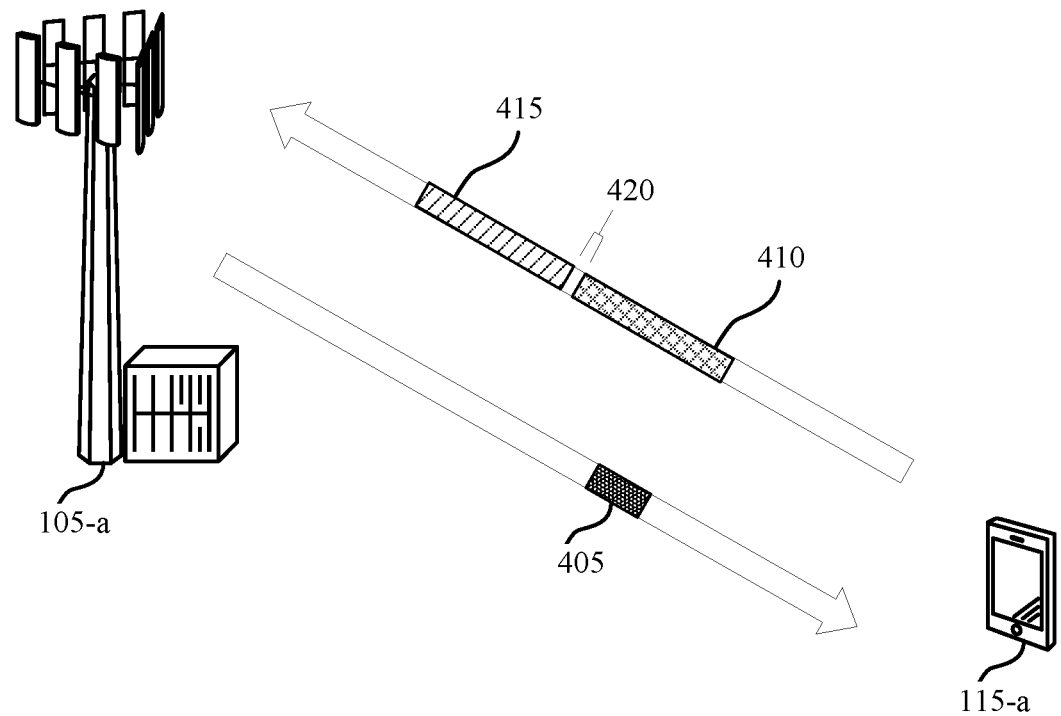
FIG. 4 illustrates an example of a wireless communications system that supports time gap enhancement for message repetition in accordance with examples as disclosed herein.

FIG. 4 illustrates an example of a wireless communications system 400 that supports time gap enhancement for message repetition in accordance with examples as disclosed herein. The wireless communications system 400 may include a base station 105-$a$ that may be an example of the base station 105 discussed in relation to FIG. 1. In some examples, the base station 105-$a$ may be an example of a network device. Though the base station 105-$a$ may be depicted or discussed herein (e.g., as an example of a network devices), one or more other network devices may be used instead. Such a network device may be a network node, an IAB node, a core network node, a base station, another network device, or any combination thereof. The wireless communications system 400 may include a UE 115-$a$ that may be an example of the UE 115 discussed in relation to FIG. 1. In some examples, the UE 115-$a$ may receive control signaling 405 from the base station 105. In some examples, the control signaling 405 may schedule one or more repetitions to be transmitted by the UE in a first control message, and the control signaling 405 may indicate a time gap threshold in a second control message. Additionally, or alternatively, the scheduling of repetitions and the indication of the time gap threshold may be included in a single control message. Such control signaling 405 may indicate a variety of configurations, settings, identification of resources, or other information. For example, the control signaling 405 may include scheduling information for the first repetition 410 and the second repetition 415. In some examples, the control signaling may indicate a time gap threshold that the UE should meet when transmitting the first repetition 410 and the second repetition 415.

For example, the UE 115-$a$ may insert a time gap 420 between the first repetition 410 and the second repetition 415. The time gap 420 may satisfy the time gap threshold indicated in the control signaling 405 or indicated in another way. For example, the time gap 420 may be at least as long as the time gap threshold. In some examples, the UE 115-$a$ may satisfy the time gap threshold by including a time gap 420 that is larger than the time gap threshold. In some examples, after receiving the control signaling 405, the UE 115-$a$ may transmit the first repetition 410 based on the control signaling. The UE 115-$a$ may also transmit, based on the control signaling, the second repetition 415. The UE 115-$a$ may transmit the second repetition 415 separated in time from the transmission of the first repetition 410 by the time gap 420. The time gap 420 may satisfy the time gap threshold identified, specified, or otherwise included in the control signaling 405.

Figure 5A:
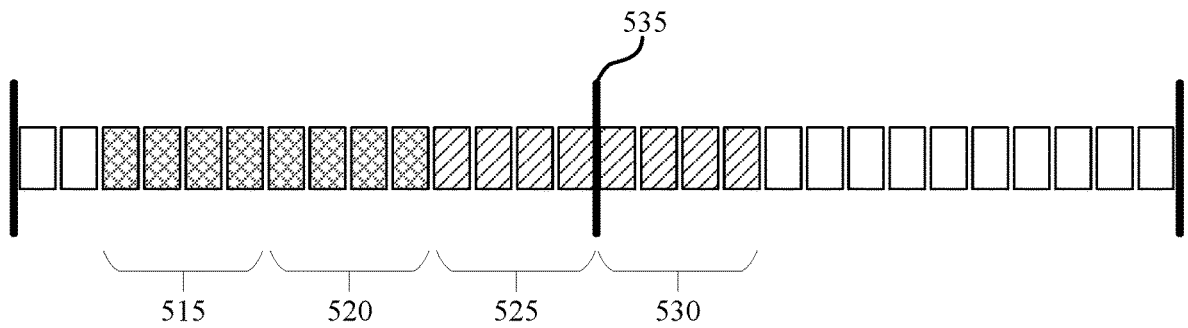
FIGS. 5A and 5B illustrate an example of a repetition scheme that supports time gap enhancement for message in accordance with examples as disclosed herein.
Figure 5B:
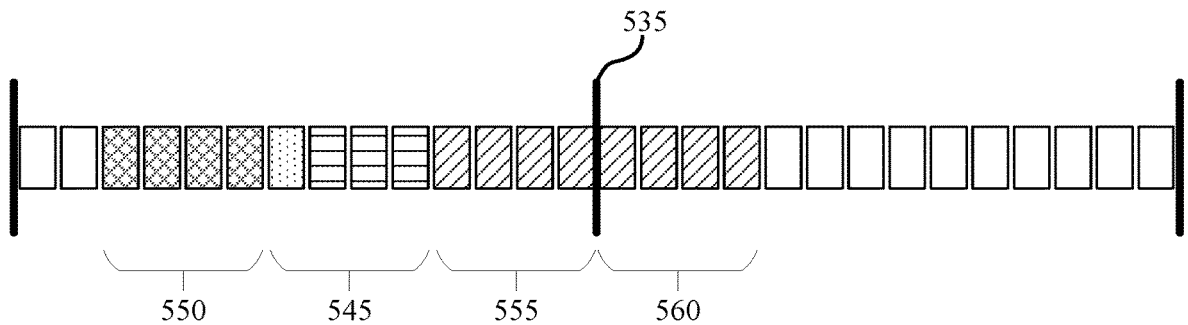

FIGS. 5A and 5B illustrate an example of a repetition scheme 500 that supports time gap enhancement for message repetition in accordance with examples as disclosed herein.

In some examples, the UE may receive control signaling that schedules sets of nominal repetitions with different transmission parameters (e.g., different uplink beams, different precoding configurations, or different sets of uplink power control parameters). In some examples, each repetition may be associated with one or more transmission parameters. Further, the control signaling may indicate a time gap threshold (e.g., a number of OFDM or other symbols between nominal repetitions), and the UE may adjust the time gap to satisfy the received time gap threshold. In some cases, the UE may adjust an existing gap (e.g., a gap created by the UE for adjustment of one or more transmission parameters) if the existing gap is smaller than the time gap threshold. In some examples, the time gap threshold may be configured through RRC. In other examples, the time gap threshold may be dynamically indicated (e.g., by DCI). In some cases, the UE may apply or adjust the time gap between each two consecutive nominal repetitions. In some examples, the UE may apply the time gap between two consecutive repetitions when the two consecutive repetitions are associated with different transmission parameters (e.g., one or more transmission parameters of a first repetition differs from one or more transmission parameters of a second repetition). In some cases, the UE may be preconfigured or configured via signaling (e.g., base station or network device signaling) to apply the time gap between each pair of consecutive nominal repetitions, and the UE may then transmit each pair of repetitions with the time gap between them.

Further, the UE may, in some examples, transmit a first repetition using a first set of resources, and transmit the second repetition using a second set of resources. In some examples, the UE may apply the time gap within the first set of resources, the second set of resources, or both. For example, the UE may apply or adjust the gap to include symbols that previously corresponded with the first repetition, the second repetition, or both.

FIG. 5A describes one example of a repetition scheme 500. In the repetition scheme 500, the UE may transmit a set of first parameter symbols 505, and a set of second parameter symbols 510, which may be examples of first parameter symbols 205, first parameter symbols 305, second parameter symbols 210, and second parameter symbols 310, as discussed in relation to FIGS. 2 and 3. In some examples, the first parameter symbols 505 may be included in a first nominal repetition 515 and a second nominal repetition 520, and the second parameter symbols 510 may be included in a third nominal repetition 525 and a fourth nominal repetition 530. In some examples, a repetition boundary may or may not coincide with a slot boundary. For example, in FIG. 5A, the repetition boundary between the third nominal repetition 525 and the fourth nominal repetition 530 lines up with the slot boundary 535. In other examples, such as in FIG. 2B, a nominal repetition may cross a slot boundary, and the nominal repetition may be divided into two or more actual repetitions based on where the nominal repetition crosses the slot boundary. In the example scheme of FIG. 5A, the nominal repetitions may be scheduled (e.g., by DCI). Further, a time gap threshold may be included in control signaling received by a UE (e.g., UE 115-a as described in relation to FIGS. 1 and 4). As described herein, the time gap threshold may set a threshold that a gap between repetitions may satisfy. In the case of the exemplary repetition scheme 500, the time gap threshold may be configured to be three symbols. In some examples, the time gap threshold may be represented by $\tau$, and therefore it may be the case that $\tau=3$. In some examples, a gap applied between repetitions may be a gap applied between two nominal repetitions with different transmission parameters, as described herein.

FIG. 5B describes one example of gap application in repetition scheme 500 in which symbols from an earlier repetition (e.g., a repetition falling before a time gap) may be repurposed (e.g., invalidated or omitted) to create, apply, or adjust a time gap that satisfies a time gap threshold. In some examples of a repetition scheme, actual repetitions may be determined. For example, first nominal repetition 515 may form a first actual repetition 550, third nominal repetition 525 may form a second actual repetition 555, and fourth nominal repetition 530 may form a third actual repetition 560. In some examples, the time gap 545 may be enforced based on the time gap threshold (e.g., a time gap threshold of 3, represented by $\tau=3$). In some examples, the time gap 545 may be applied or adjusted by invalidating a number of symbols of an earlier repetition. For example, the UE may invalidate the last $\tau$ symbols of the earlier nominal repetition. In some cases, such invalidation may be done on symbols of an earlier repetition that may be associated with different transmission parameters than a later repetition. For example, the time gap 545 of FIG. 5B may satisfy the exemplary time gap threshold of three symbols because there are multiple (three) intervening invalid symbols. In some examples, the UE may then transmit the first actual repetition 550 and the second actual repetition 555 with the applied or adjusted time gap 545 between them. In some examples, the UE transmit multiple repetitions of an uplink message with the time gap between each pair of consecutive repetitions. Based on the approaches described herein, the UE may utilize invalid symbols as part of the time gap 545, instead of ignoring them and adding a fixed gap that may introduce unnecessary transmission delays.

In some examples, applying or adjusting the time gap 545 may leave a single symbol left from the second nominal repetition 520 to form an actual repetition. However, in some examples, such an actual repetition may be omitted based on a rule or configuration, thus forming an omitted repetition, such as omitted repetition 570. In other examples, the omitted repetition 570 may be omitted for other reasons.

Figure 6A:
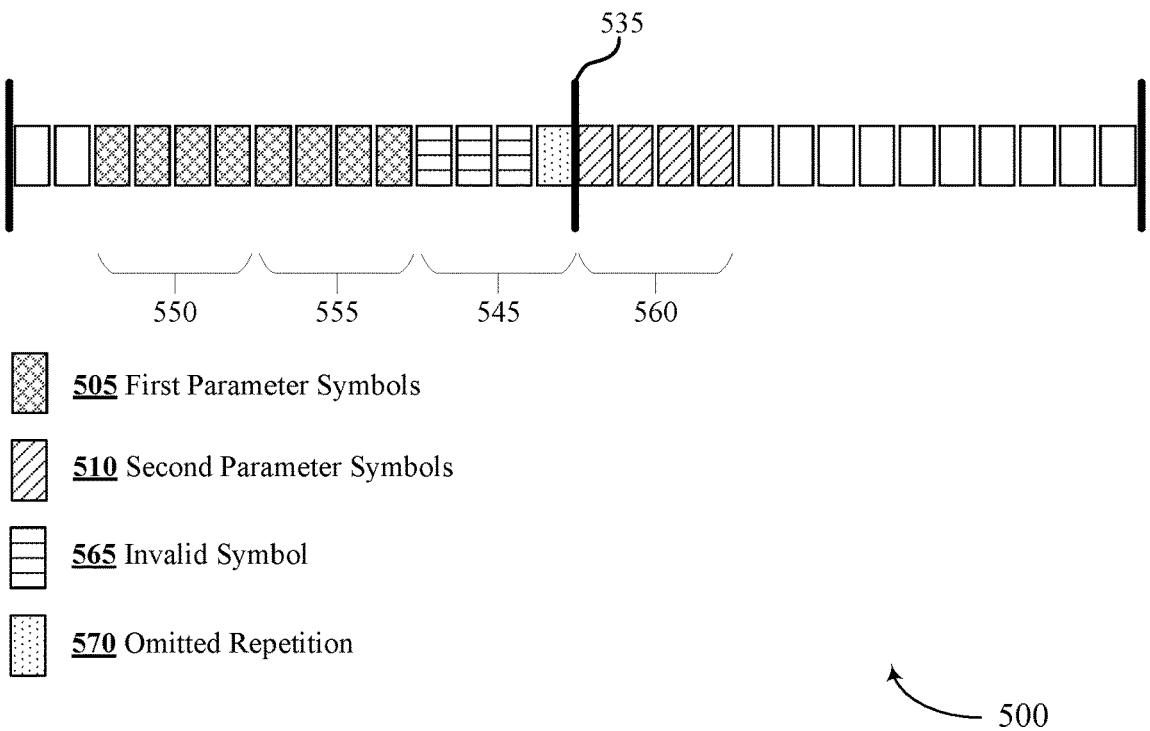
FIGS. 6A and 6B illustrate an example of a repetition scheme that supports time gap enhancement for message repetition in accordance with examples as disclosed herein.
Figure 6B:
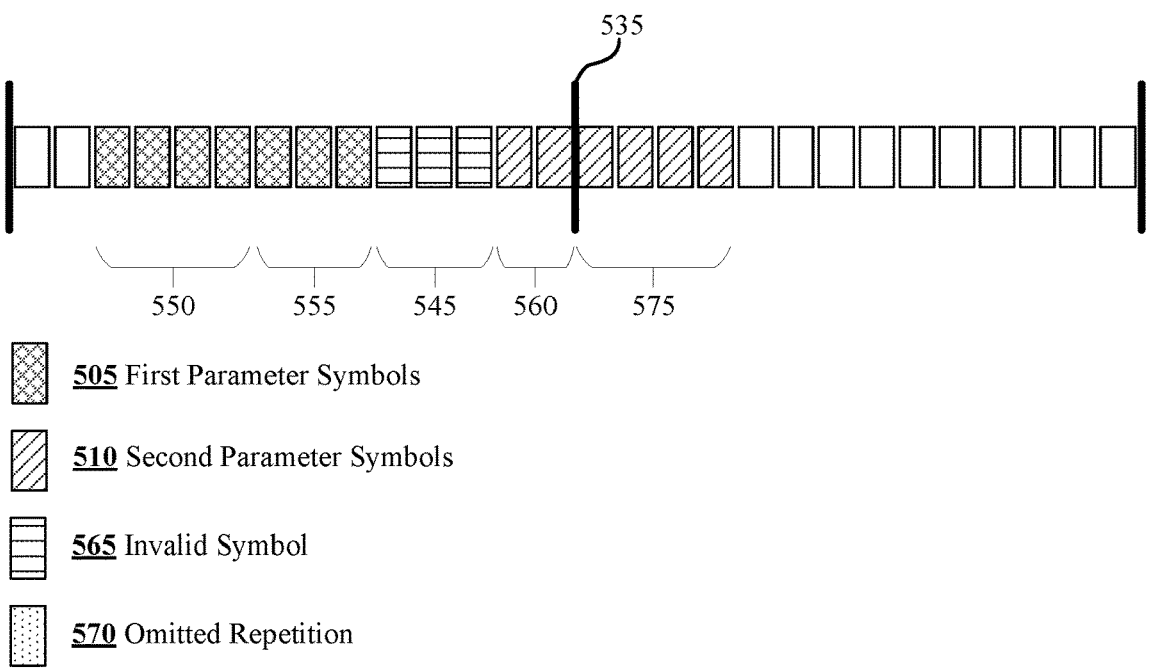

FIGS. 6A and 6B illustrate a continuation of the example of a repetition scheme 500 that supports time gap enhancement for message repetition in accordance with examples as disclosed herein.

FIG. 6A describes one example of gap enforcement in repetition scheme 500 in which symbols from a later repetition (e.g., a repetition falling after a time gap) may be repurposed (e.g., invalidated or omitted) to create, apply, or adjust a time gap that satisfies the time gap threshold. In some examples, actual repetitions may be formed. For example, first nominal repetition 515 may form a first actual repetition 550, and fourth nominal repetition 530 may form a third actual repetition 560. However, in contrast to the example of FIG. 5B, the second nominal repetition 520 may form the second actual repetition 555. In some examples, the UE may apply or adjust the time gap 545 based on the time gap threshold (e.g., a time gap threshold of 3, represented by $\tau=3$). In some examples, the UE may apply or adjust the time gap 545 by invalidating a number of symbols of a later repetition (e.g., the UE may invalidate the first $\tau$ symbols of the later nominal repetition). For example, the UE may apply or adjust the time gap 545 by invalidating three symbols corresponding to the third nominal repetition 525, which is associated with second parameter symbols 510, while the second nominal repetition 520 (and the second actual repetition 555) is associated with first parameter symbols 505. In this way, the UE may apply or adjust the time gap 545 through the use of invalid symbols 565 that may be part of the time gap 545, instead of ignoring them and adding a fixed gap that may introduce unnecessary transmission delays.

In some examples, applying or adjusting the time gap may leave a single symbol left from the third nominal repetition 525 to form an actual repetition. However, in some examples, such an actual repetition may be omitted based on a rule or configuration, thus forming an omitted repetition, such as omitted repetition 570. In other examples, the omitted repetition 570 may be omitted for other reasons.

FIG. 6B describes one example of repetition scheme 500 in which symbols from both an earlier repetition and a later repetition (e.g., repetitions falling before and after a time gap) may be repurposed (e.g., invalidated or omitted) to create, apply, or adjust a time gap that satisfies the time gap threshold. In some examples, actual repetitions may be formed. For example, first nominal repetition 515 may form a first actual repetition 550, second nominal repetition 520 may form a second actual repetition 555, third nominal repetition 525 may form a third actual repetition 560, and fourth nominal repetition may form a fourth actual repetition 575. In some examples, the UE may apply or adjust the time gap 545 to satisfy the time gap threshold (e.g., a time gap threshold of 3, represented by $\tau=3$). In some examples, the UE may apply or adjust the time gap 545 by invalidating a number of symbols of both an earlier and a later repetition. For example, the UE may apply or adjust the time gap 545 by invalidating the last symbol of the second nominal repetition 520 and the first two symbols of the third nominal repetition 525. In this way, the time gap 545 may satisfy the time gap threshold (which, in this case is three symbols). In this way, the UE may utilize invalid symbols as part of the time gap 545, instead of ignoring them and adding a fixed gap that may introduce unnecessary transmission delays.

In some examples, the distribution of gap symbols (e.g., symbols from the repetitions that are invalidated to form the gap) may be determined by making the last $|\tau/2|$ symbols of an earlier nominal repetition (e.g., second nominal repetition 520) invalid symbols. In some examples, the first $\tau-|\tau/2|$ symbols of a later nominal repetition (e.g., third nominal repetition 525) are invalidated. In this way, the time gap 545 may be formed by invalidating symbols from consecutive repetitions. Alternatively, or additionally, the distribution of the gap symbols between two nominal repetitions may be configured (e.g., through RRC configuration) or may be dynamically indicated (e.g., dynamically indicated through DCI).

Figure 7A:
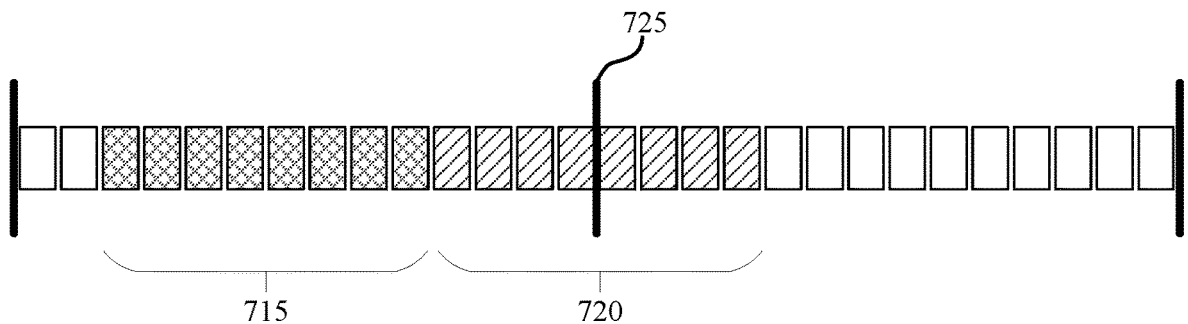
FIGS. 7A, 7B, and 7C illustrate an example of a repetition scheme that supports time gap enhancement for message repetition in accordance with examples as disclosed herein.
Figure 7B:
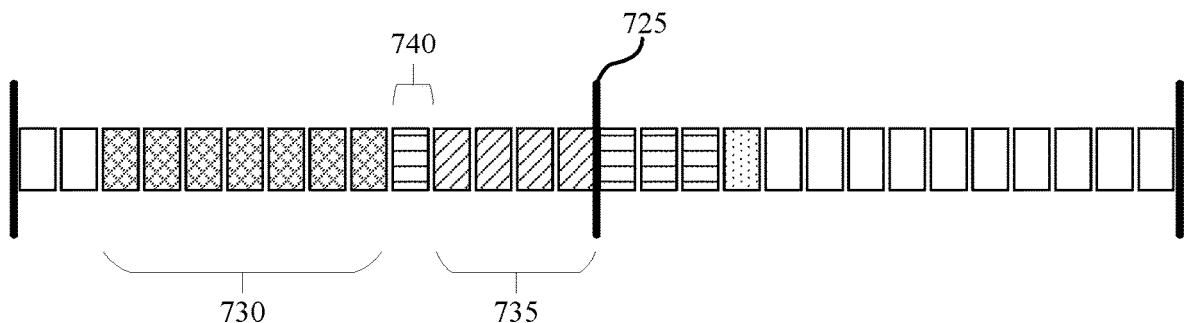
Figure 7C:
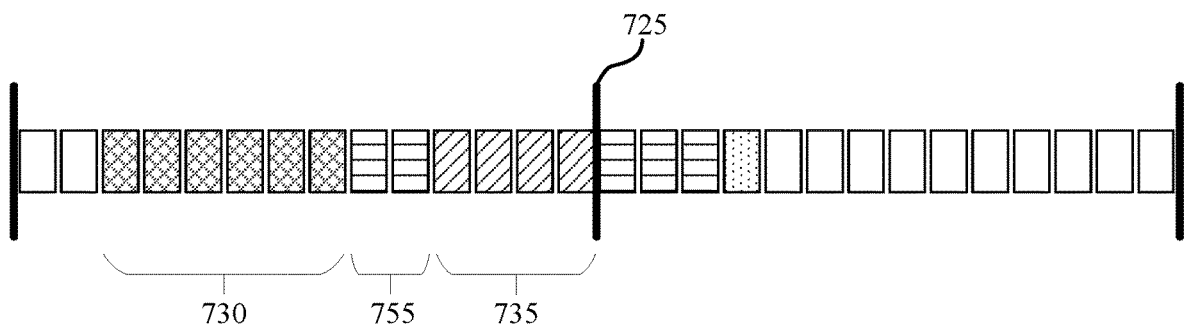

FIGS. 7A, 7B, and 7C illustrate an example of a repetition scheme 700 that supports time gap enhancement for message repetition in accordance with examples as disclosed herein.

In some examples, the UE may receive control signaling that may schedule sets of nominal repetitions with different transmission parameters (e.g., different uplink beams, different precoding configurations, or different sets of uplink power control parameters). Further, the control signaling may indicate a time gap threshold (e.g., a number of OFDM or other symbols to be inserted between repetitions), and the UE may adjust the time gap to satisfy the received time gap threshold. In some cases, the UE may adjust an existing gap (e.g., the gap created by the UE for adjustment of one or more transmission parameters) if the existing gap is smaller than the time gap threshold. In some examples, the time gap threshold may be configured through RRC. In other examples, the time gap threshold may be dynamically indicated (e.g., by DCI). In some examples, the time gap may be applied between actual repetitions. In some cases, the UE may apply or adjust the time gap between each two consecutive actual repetitions, and, in some cases, the two consecutive repetitions may be associated with different transmission parameters. In some examples, the UE may apply or adjust the gap if an existing gap between actual repetitions (e.g., designated by $\tau'$) is less than the time gap threshold (e.g., designated by $\tau$). For example, if the existing gap is one symbol, and the time gap threshold is three symbols, the gap may be applied or enforced through approaches described herein. In some examples, an error case may be identified or declared if a number of symbols in an actual repetition is less than a number of symbols determined to be invalidated to form a time gap. In the case of such an error, the UE may adjust the configuration in any number of ways to avoid the error case (e.g., a distribution of symbols identified to be invalidated may be adjusted to avoid the error case).

FIG. 7A describes one example of a repetition scheme 700. The repetition scheme 700 may include a set or group of first parameter symbols 705, and a set or group of second parameter symbols 710. In some examples, the UE may include the first parameter symbols 705 in a first nominal repetition 715 and the second parameter symbols in a second nominal repetition 720. In some examples, the first parameter symbols 705 may be associated with a first set of one or more transmission parameters, and the second parameter symbols 710 may be associated with a second set of transmission parameters, and the second set of one or more transmission parameters may be different than the first set of transmission parameters in some way (e.g., a different uplink beam, precoding configuration, uplink power setting, or other differences). In the example shown in FIG. 7A, each nominal repetition has eight symbols, but various numbers of symbols may be used in the nominal repetitions. In some examples, a nominal repetition may cross a slot boundary 725. For example, the second nominal repetition 720 may cross the slot boundary 725.

FIG. 7B describes one example of the repetition scheme 700 in which an actual repetition gap may be formed, and actual repetitions may be identified, formed, or determined from nominal repetitions. For example, a first actual repetition 730 may be formed from first nominal repetition 715, and a second actual repetition 735 may be formed from second nominal repetition 720. In some examples, as part of or as a result of forming or determining actual repetitions, a gap may be created. For example, an actual repetition gap 740 may be formed by an invalid symbol 745. In some examples, this actual repetition gap 740 may be designated as $\tau'$. In some examples, the UE may utilize this actual repetition gap 740 to determine a number of symbols to be invalidated to form a time gap that satisfies the time gap threshold. In some examples, the actual repetition gap 740 may be included as part of a time gap that satisfied the time gap threshold. In some examples, the UE may invalidate or omit portions of nominal repetitions. For example, as depicted in FIG. 7B, the UE invalidate or omit some symbols of the second nominal repetition 720 (designated here as invalid symbols 745 or omitted repetitions 750). In some examples, the UE may invalidate or omit such symbols as described by various approaches herein in reference to FIGS. 2, 3, 5 and 6.

FIG. 7C describes one example of the repetition scheme 700 in which the UE may repurpose (e.g., invalidate or omit) symbols from an earlier repetition (e.g., a repetition falling before a time gap) to create, apply, or adjust a time gap that satisfies a time gap threshold. In some examples, once actual repetitions have been determined, formed, or identified, the UE may apply or adjust a time gap 755 between successive actual repetitions. In some cases, the time gap 755 to be formed is based on (and may include) an existing actual repetition gap 740. For example, the UE may apply or adjust the time gap 755 to satisfy a time gap threshold by including the existing actual repetition gap 740 (e.g., a time gap threshold of two symbols may be satisfied by forming a time gap 755 of two symbols).

In some cases, and as shown in FIG. 7C, the UE may invalidate a number of symbols from an earlier repetition (e.g., the first actual repetition 730) to form a portion of the time gap 755. In some examples, a number of symbols to be invalidated by the UE from an earlier repetition may be derived from the time gap threshold ($\tau$) and the existing actual repetition gap 740 ($\tau'$). For example, the UE may apply or adjust the time gap 755 by making the last $\tau-\tau'$ symbols of the earlier actual repetition (e.g., the first actual repetition 730) invalid symbols. As shown in FIG. 7C, and assuming a gap threshold ($\tau$) of two symbols, the last one symbol of the first actual repetition 730 was invalidated to create the time gap 755 of two symbols that satisfies the time gap threshold.

In some cases, a number of symbols from a later repetition (e.g., the second actual repetition 735) may be invalidated to form a portion of the time gap 755. In some examples, a number of symbols to be invalidated from a later repetition may be derived from the time gap threshold (τ) and the existing actual repetition gap 740 (τ'). For example, the UE may apply or adjust the time gap 755 by making the first τ–τ' symbols of the later actual repetition (e.g., the second actual repetition 735) invalid symbols. For example, assuming a gap threshold (τ) of two symbols and an existing actual repetition gap 740 of one symbol, the first one symbol of the second actual repetition 735 would be invalidated to create the time gap 755 of two symbols that satisfies the time gap threshold.

In some cases, the UE may invalidate a number of symbols from both an earlier repetition (e.g., the first actual repetition 730) and a later repetition (e.g., the second actual repetition 735) to form a portion of the time gap 755. In some examples, a number of symbols to be invalidated by the UE from both repetitions may be derived from the time gap threshold (τ) and the existing actual repetition gap 740 (τ'). For example, the UE may force the time gap 755 by making the last $$\left\lceil \frac{\tau - \tau'}{2} \right\rceil$$

symbols of the earlier actual repetition (e.g., the first actual repetition 730) invalid symbols and making the $$\tau - \tau' - \left\lceil \frac{\tau - \tau'}{2} \right\rceil$$

first symbols of the later actual repetition (e.g., the second actual repetition 735) invalid.

In yet other examples, a distribution of symbols to be invalidated between two actual repetitions may be configured (e.g., configured through RRC) or dynamically indicated (e.g., dynamically indicated through DCI).

Figure 8:
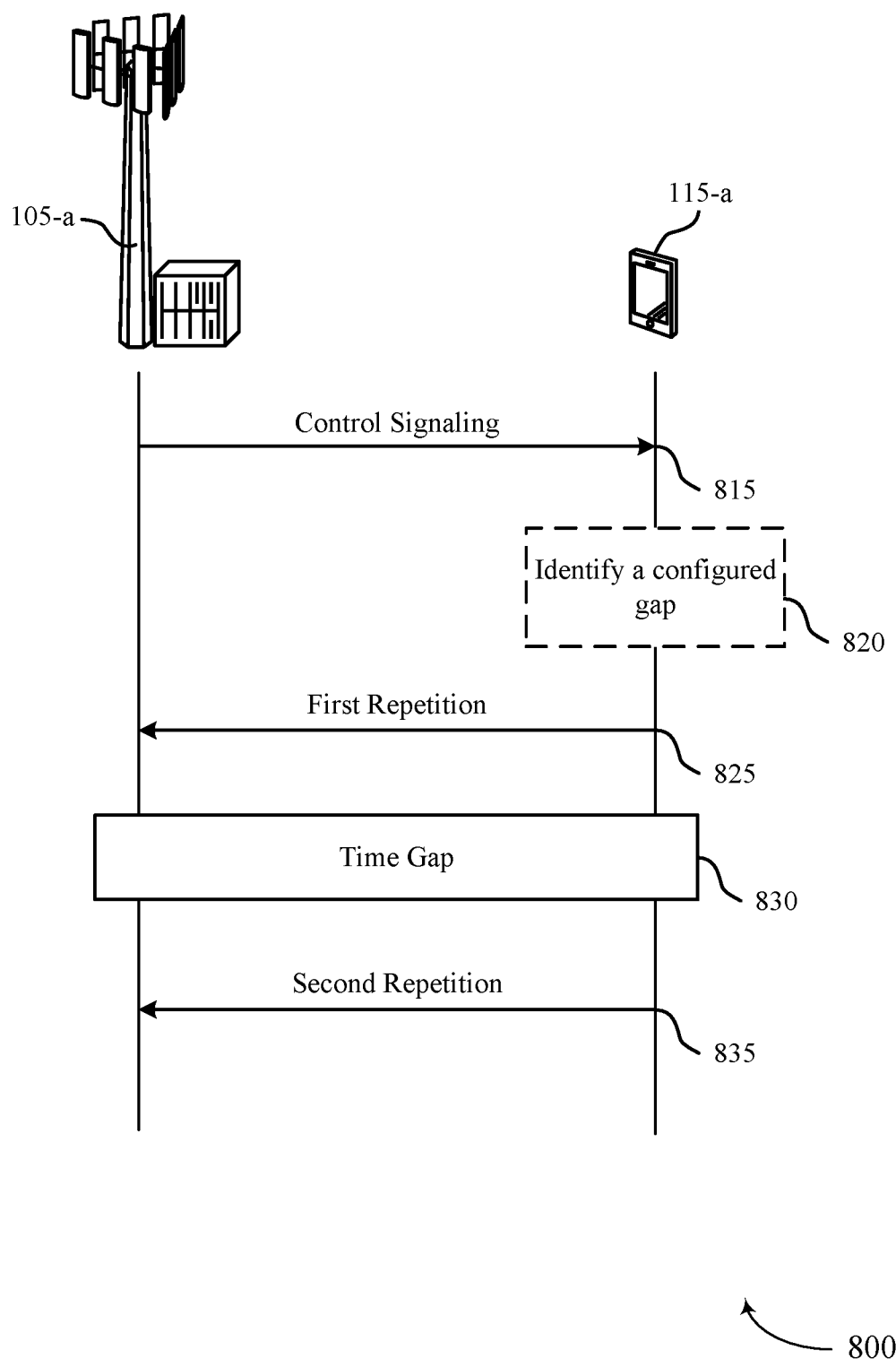
FIG. 8 illustrates an example of a process flow that supports time gap enhancement for message repetition in accordance with examples as disclosed herein.

FIG. 8 illustrates an example of a process flow 800 that supports time gap enhancement for message repetition in accordance with examples as disclosed herein. The process flow 800 may include operations, signaling, or other procedures performed by base station 105-a and UE 115-a. In some examples, the base station 105-a may be an example of a network device. Though the base station 105-a may be depicted or discussed herein (e.g., as an example of a network devices), one or more other network devices may be used instead. Such a network device may be a network node, an IAB node, a core network node, a base station, another network device, or any combination thereof.

At 815, the UE 115-a may receive control signaling scheduling transmission of a plurality of repetitions of an uplink message and indicating a time gap threshold between at least one pair of adjacent repetitions.

In some cases, receiving the control signaling may include receiving the control signaling indicating the first transmission parameter that may specify a first uplink transmission beam for transmission of the first repetition of the uplink message and the second transmission parameter that may specify a second uplink transmission beam for transmission of the second repetition of the uplink message that differs from the first uplink transmission beam.

In some cases, receiving the control signaling may include receiving the control signaling indicating the first transmission parameter that may specify a first precoding indication for transmission of the first repetition of the uplink message and the second transmission parameter that may specify a second precoding indication for transmission of the second repetition of the uplink message that differs from the first precoding indication.

In some cases, receiving the control signaling may include receiving the control signaling indicating the first transmission parameter that may specify a first power control parameter for transmission of the first repetition of the uplink message and the second transmission parameter that may specify a second power control parameter for transmission of the second repetition of the uplink message that differs from the first power control parameter.

In some cases, receiving the control signaling may include receiving a first control message scheduling the plurality of repetitions of the uplink message and a second control message indicating the time gap threshold.

In some cases, the control signaling may include RRC signaling. In some cases, the control signaling may include DCI. In some cases, the control signaling may include other types of control signaling.

At 820, the UE 115-a may identify a configured gap between a first repetition and a second repetition. In some cases, the configured gap may be recognized as being between a first sub-repetition and a second sub-repetition.

At 825, the UE 115-a may transmit a first repetition of the uplink message based on the control signaling. In some cases, transmitting the first repetition of the uplink message may include transmitting the first repetition of the uplink message within a first subset of resources indicated by the control signaling for the first repetition, wherein the time gap corresponds to a second subset of resources indicated by the control signaling for the first repetition. In some cases, transmitting the first repetition of the uplink message may include transmitting the first repetition of the uplink message within a first subset of resources indicated by the control signaling for the first repetition based on invalidating one or more symbols within a second subset of resources indicated by the control signaling for the first repetition corresponding to the time gap threshold. For example, symbols from an earlier repetition may be invalidated as discussed in more detail with reference to at least FIG. 5B.

In some cases, where the first repetition is a first sub-repetition, the UE may transmit the first sub-repetition of the uplink message within a first subset of resources indicated by the control signaling for the first sub-repetition based on the configured gap and invalidating one or more symbols within a second subset of resources indicated by the control signaling for the first sub-repetition corresponding to the time gap threshold.

At 835, the UE 115-a may transmit, based on the control signaling, a second repetition of the uplink message separated in time from transmission of the first repetition of the uplink message by the time gap (e.g., the time gap at 830) satisfying the time gap threshold.

In some cases, transmitting the second repetition of the uplink message may include transmitting the second repetition of the uplink message within a first subset of resources indicated by the control signaling for the second repetition, wherein the time gap corresponds to a second subset of resources indicated by the control signaling for the second repetition. Further, transmitting the second repetition of the uplink message may include transmitting the second repetition of the uplink message within a first subset of resources indicated by the control signaling for the second repetition based on invalidating one or more symbols within a second subset of resources indicated by the control signaling for the second repetition corresponding to the time gap threshold. For example, symbols from a later repetition may be invalidated as discussed in more detail with reference to at least FIG. 6A.

In some cases, where the second repetition is a second sub-repetition, the UE may transmit the second sub-repetition of the uplink message within a first subset of resources indicated by the control signaling for the second sub-repetition based on the configured gap and invalidating one or more symbols within a second subset of resources indicated by the control signaling for the second sub-repetition corresponding to the time gap threshold.

In some cases, transmitting the first repetition may include transmitting the first repetition of the uplink message within a first subset of resources indicated by the control signaling for the first repetition based on invalidating one or more symbols within a second subset of resources indicated by the control signaling for the first repetition corresponding to the time gap threshold, and transmitting the second repetition may include transmitting the second repetition of the uplink message within a first subset of resources indicated by the control signaling for the second repetition based on invalidating one or more symbols within a second subset of resources indicated by the control signaling for the second repetition corresponding to the time gap threshold. For example, symbols may be invalidated from both an earlier and a later repetition, as discussed in more detail with reference to FIG. 6B.

In some cases, transmitting the second repetition of the uplink message may include transmitting the second repetition of the uplink message separated in time from transmission of the first repetition of the uplink message by the time gap based on a first transmission parameter configured for transmission of the first repetition of the uplink message differing from a second transmission parameter configured for transmission of the second repetition of the uplink message. For example, the first repetition may be transmitted using a first beam, and the second transmission may be transmitted using a second beam.

In some cases, transmitting the first and second repetitions of the uplink message may include transmitting each repetition of the uplink message having the time gap between each pair of consecutive repetitions of the plurality of repetitions. For example, in a series of 3 repetitions, there may be a time gap placed in between each pair of repetitions, such that a series of transmissions may have, in order, a first repetition, a first time gap, a second repetition, a second time gap, and a third repetition. The approaches and techniques described herein may be applied to any number of repetitions.

In some cases, transmitting the first repetition may include transmitting the first repetition of the uplink message within a first subset of resources indicated by the control signaling for the first repetition based at least in part on the first subset of resources indicated by the control signaling for the first repetition crossing a slot boundary, and transmitting the second repetition comprises transmitting the second repetition of the uplink message within a second subset of resources indicated by the control signaling for the first repetition that occurs after the slot boundary.

In some cases, the UE may determine that the first repetition is a first sub-repetition and that the second repetition is a second sub-repetition. In such cases, transmitting the first repetition and the second repetition may include transmitting the first sub-repetition, the second sub-repetition, or both, on a first subset and a second subset of resources indicated by the control signaling for the plurality of repetitions, the first subset of resources separated in time by the time gap from the second subset of resources.

In some cases, the first repetition may be a first nominal repetition and the second repetition may be a second nominal repetition. For example, as discussed with reference to FIGS. 2-3 and 5-7, nominal repetitions may be subject to gap enforcement.

In some cases, each uplink message repetition may be associated with a corresponding transmission parameter. For example, each repetition may be associated with different uplink beams, different precoding configurations, or different sets of uplink power control parameters.

In some cases, the first repetition may be a first sub-repetition of a third repetition of a plurality of repetitions, and the second repetition may be a second sub-repetition of the third repetition. Further, in some cases, the first sub-repetition may be a first actual repetition and the second sub-repetition may be a second actual repetition. For example, as discussed in FIG. 7, actual repetitions may also be subject to gap enforcement.

Figure 9:
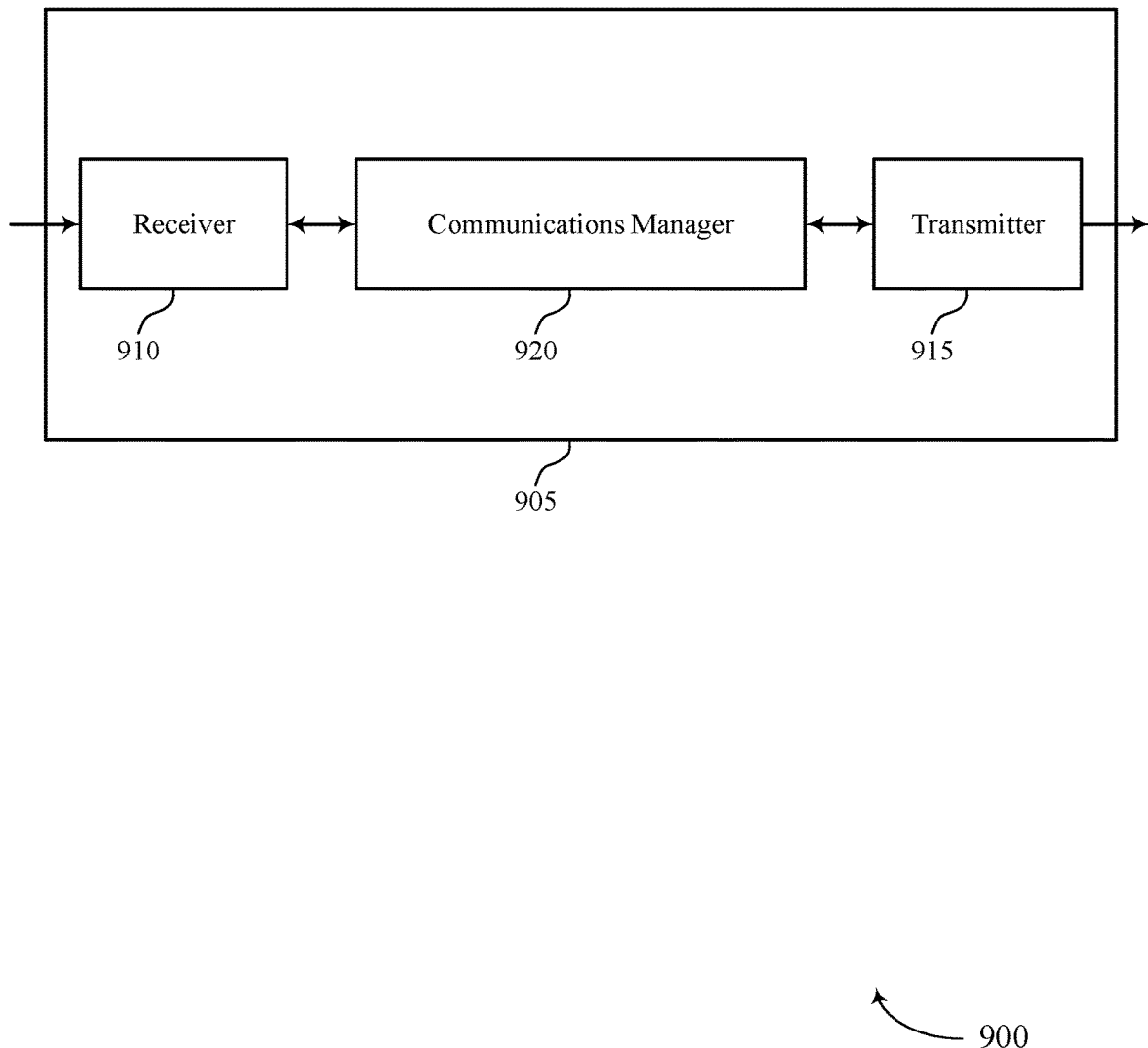
FIGS. 9 and 10 show block diagrams of devices that support time gap enhancement for message repetition in accordance with examples as disclosed herein.

FIG. 9 shows a block diagram 900 of a device 905 that supports time gap enhancement for message repetition in accordance with examples as disclosed herein. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to time gap enhancement for message repetition). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to time gap enhancement for message repetition). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of time gap enhancement for message repetition as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving control signaling scheduling transmission of a set of multiple repetitions of an uplink message and indicating a time gap threshold between at least one pair of adjacent repetitions. The communications manager 920 may be configured as or otherwise support a means for transmitting a first repetition of the uplink message based on the control signaling. The communications manager 920 may be configured as or otherwise support a means for transmitting, based on the control signaling, a second repetition of the uplink message separated in time from transmission of the first repetition of the uplink message by a time gap satisfying the time gap threshold.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, or more efficient utilization of communication resources.

Figure 10:
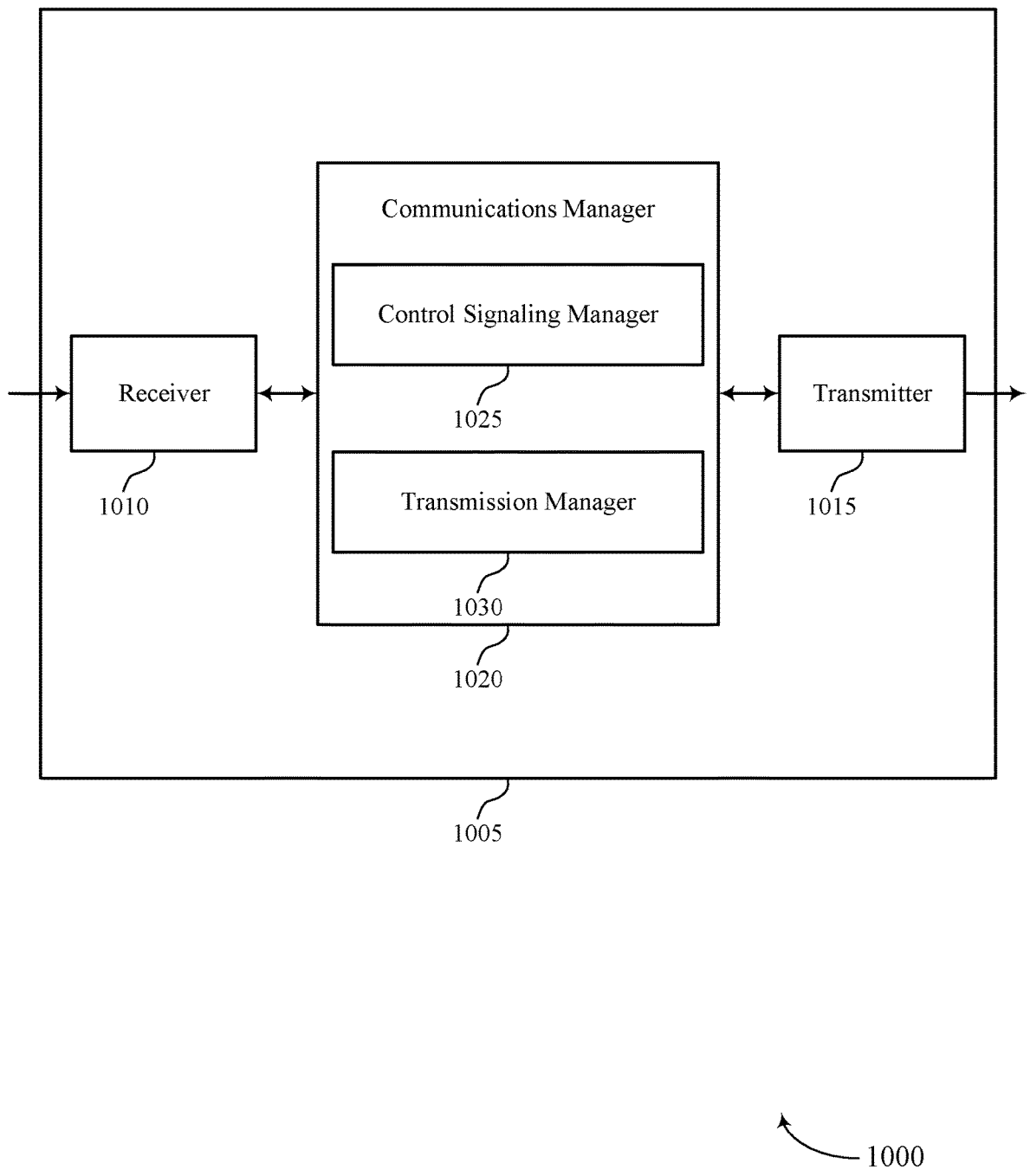

FIG. 10 shows a block diagram 1000 of a device 1005 that supports time gap enhancement for message repetition in accordance with examples as disclosed herein. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to time gap enhancement for message repetition). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to time gap enhancement for message repetition). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of time gap enhancement for message repetition as described herein. For example, the communications manager 1020 may include a control signaling manager 1025 a transmission manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The control signaling manager 1025 may be configured as or otherwise support a means for receiving control signaling scheduling transmission of a set of multiple repetitions of an uplink message and indicating a time gap threshold between at least one pair of adjacent repetitions. The transmission manager 1030 may be configured as or otherwise support a means for transmitting a first repetition of the uplink message based on the control signaling. The transmission manager 1030 may be configured as or otherwise support a means for transmitting, based on the control signaling, a second repetition of the uplink message separated in time from transmission of the first repetition of the uplink message by a time gap satisfying the time gap threshold.

Figure 11:
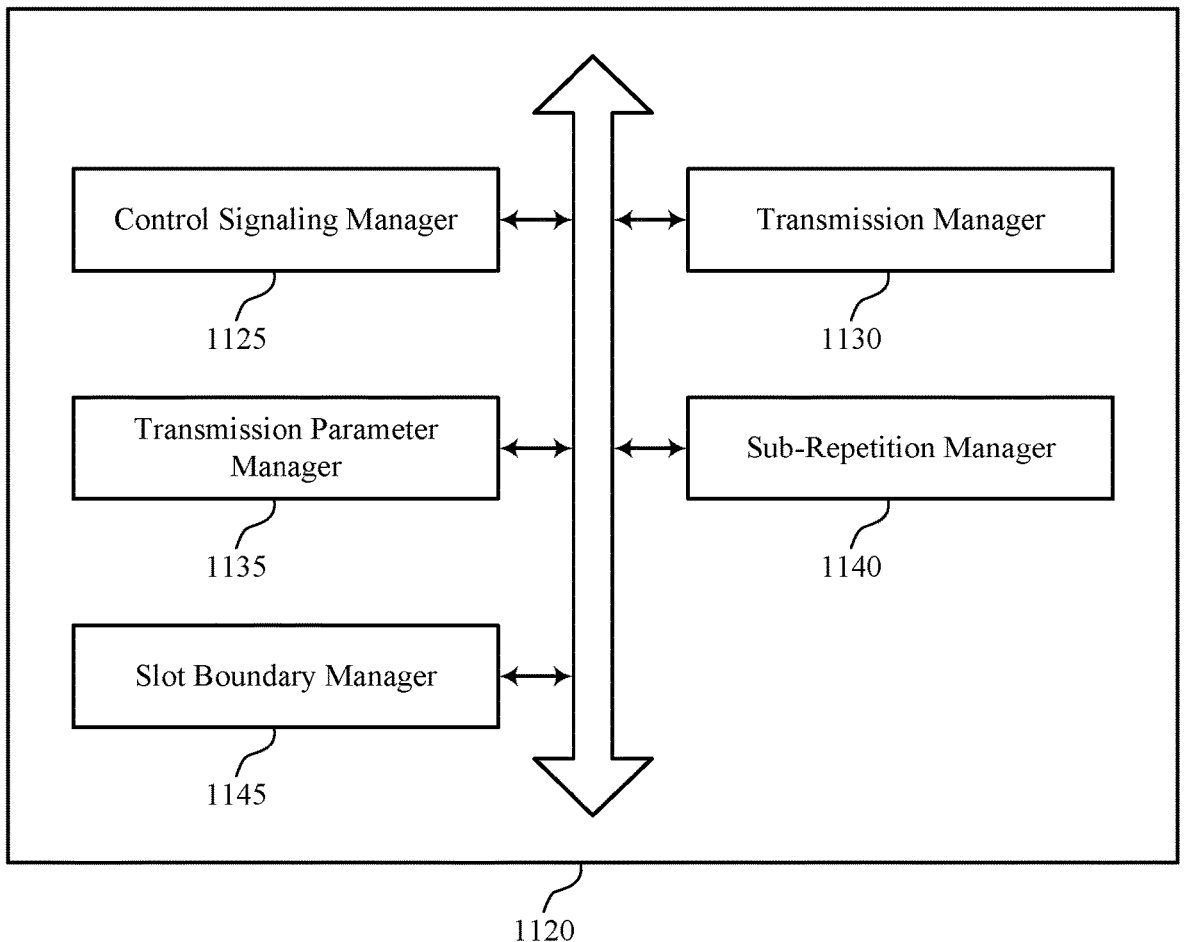
FIG. 11 shows a block diagram of a communications manager that supports time gap enhancement for message repetition in accordance with examples as disclosed herein.

FIG. 11 shows a block diagram 1100 of a communications manager 1120 that supports time gap enhancement for message repetition in accordance with examples as disclosed herein. The communications manager 1120 may be an example of aspects of a communications manager 920, a communications manager 1020, or both, as described herein. The communications manager 1120, or various components thereof, may be an example of means for performing various aspects of time gap enhancement for message repetition as described herein. For example, the communications manager 1120 may include a control signaling manager 1125, a transmission manager 1130, a transmission parameter manager 1135, a sub-repetition manager 1140, a slot boundary manager 1145, or any combination thereof. Each of these components may communicate, directly or indirectly, with one another (e.g., via one or more buses).

The communications manager 1120 may support wireless communication at a UE in accordance with examples as disclosed herein. The control signaling manager 1125 may be configured as or otherwise support a means for receiving control signaling scheduling transmission of a set of multiple repetitions of an uplink message and indicating a time gap threshold between at least one pair of adjacent repetitions. The transmission manager 1130 may be configured as or otherwise support a means for transmitting a first repetition of the uplink message based on the control signaling. In some examples, the transmission manager 1130 may be configured as or otherwise support a means for transmitting, based on the control signaling, a second repetition of the uplink message separated in time from transmission of the first repetition of the uplink message by a time gap satisfying the time gap threshold.

In some examples, to support transmitting the first and second repetitions of the uplink message, the transmission manager 1130 may be configured as or otherwise support a means for transmitting one or more repetitions of the uplink message having the time gap between one or more pairs of consecutive repetitions of the plurality of repetitions.

In some examples, to support transmitting the second repetition of the uplink message, the transmission parameter manager 1135 may be configured as or otherwise support a means for transmitting the second repetition of the uplink message separated in time from transmission of the first repetition of the uplink message by the time gap based on a first transmission parameter configured for transmission of the first repetition of the uplink message differing from a second transmission parameter configured for transmission of the second repetition of the uplink message.

In some examples, to support receiving the control signaling, the control signaling manager 1125 may be configured as or otherwise support a means for receiving the control signaling indicating the first transmission parameter that specifies a first uplink transmission beam for transmission of the first repetition of the uplink message and the second transmission parameter that specifies a second uplink transmission beam for transmission of the second repetition of the uplink message that differs from the first uplink transmission beam.

In some examples, to support receiving the control signaling, the control signaling manager 1125 may be configured as or otherwise support a means for receiving the control signaling indicating the first transmission parameter that specifies a first precoding indication for transmission of the first repetition of the uplink message and the second transmission parameter that specifies a second precoding indication for transmission of the second repetition of the uplink message that differs from the first precoding indication.

In some examples, to support receiving the control signaling, the control signaling manager 1125 may be configured as or otherwise support a means for receiving the control signaling indicating the first transmission parameter that specifies a first power control parameter for transmission of the first repetition of the uplink message and the second transmission parameter that specifies a second power control parameter for transmission of the second repetition of the uplink message that differs from the first power control parameter.

In some examples, to support transmitting the first repetition of the uplink message, the transmission manager 1130 may be configured as or otherwise support a means for transmitting the first repetition of the uplink message within a first subset of resources indicated by the control signaling for the first repetition, where the time gap corresponds to a second subset of resources indicated by the control signaling for the first repetition.

In some examples, to support transmitting the first repetition of the uplink message, the transmission manager 1130 may be configured as or otherwise support a means for transmitting the first repetition of the uplink message within a first subset of resources indicated by the control signaling for the first repetition based on invalidating one or more symbols within a second subset of resources indicated by the control signaling for the first repetition corresponding to the time gap threshold.

In some examples, to support transmitting the second repetition of the uplink message, the transmission manager 1130 may be configured as or otherwise support a means for transmitting the second repetition of the uplink message within a first subset of resources indicated by the control signaling for the second repetition, where the time gap corresponds to a second subset of resources indicated by the control signaling for the second repetition.

In some examples, to support transmitting the second repetition of the uplink message, the transmission manager 1130 may be configured as or otherwise support a means for transmitting the second repetition of the uplink message within a first subset of resources indicated by the control signaling for the second repetition based on invalidating one or more symbols within a second subset of resources indicated by the control signaling for the second repetition corresponding to the time gap threshold.

In some examples, transmitting the first repetition includes transmitting the first repetition of the uplink message within a first subset of resources indicated by the control signaling for the first repetition based on invalidating one or more symbols within a second subset of resources indicated by the control signaling for the first repetition corresponding to the time gap threshold. In some examples, transmitting the second repetition includes transmitting the second repetition of the uplink message within a first subset of resources indicated by the control signaling for the second repetition based on invalidating one or more symbols within a second subset of resources indicated by the control signaling for the second repetition corresponding to the time gap threshold.

In some examples, one or more of the uplink message repetitions are associated with a corresponding transmission parameter.

In some examples, the first repetition is a first sub-repetition of a third repetition of the set of multiple repetitions and the second repetition is a second sub-repetition of the third repetition.

In some examples, the sub-repetition manager 1140 may be configured as or otherwise support a means for where the first sub-repetition is a first actual repetition and the second sub-repetition is a second actual repetition.

In some examples, to support transmitting the first sub-repetition of the uplink message, the sub-repetition manager 1140 may be configured as or otherwise support a means for identifying a configured gap between the first sub-repetition and the second sub-repetition. In some examples, to support transmitting the first sub-repetition of the uplink message, the sub-repetition manager 1140 may be configured as or otherwise support a means for transmitting the first sub-repetition of the uplink message within a first subset of resources indicated by the control signaling for the first sub-repetition based on the configured gap and invalidating one or more symbols within a second subset of resources indicated by the control signaling for the first sub-repetition corresponding to the time gap threshold.

In some examples, to support transmitting the second sub-repetition of the uplink message, the sub-repetition manager 1140 may be configured as or otherwise support a means for identifying a configured gap between the first sub-repetition and the second sub-repetition. In some examples, to support transmitting the second sub-repetition of the uplink message, the sub-repetition manager 1140 may be configured as or otherwise support a means for transmitting the second sub-repetition of the uplink message within a first subset of resources indicated by the control signaling for the second sub-repetition based on the configured gap and invalidating one or more symbols within a second subset of resources indicated by the control signaling for the second sub-repetition corresponding to the time gap threshold.

In some examples, the slot boundary manager 1145 may be configured as or otherwise support a means for transmitting the first repetition includes transmitting the first repetition of the uplink message within a first subset of resources indicated by the control signaling for the first repetition based on the first subset of resources indicated by the control signaling for the first repetition crossing a slot boundary. In some examples, the slot boundary manager 1145 may be configured as or otherwise support a means for transmitting the second repetition includes transmitting the second repetition of the uplink message within a second subset of resources indicated by the control signaling for the first repetition that occurs after the slot boundary.

In some examples, the sub-repetition manager 1140 may be configured as or otherwise support a means for determining that the first repetition is a first sub-repetition and that the second repetition is a second sub-repetition. In some examples, the sub-repetition manager 1140 may be configured as or otherwise support a means for where transmitting the first repetition and the second repetition includes transmitting the first sub-repetition, the second sub-repetition, or both, on a first subset and a second subset of resources indicated by the control signaling for the set of multiple repetitions, the first subset of resources separated in time by the time gap from the second subset of resources.

In some examples, the first repetition is a first nominal repetition and the second repetition is a second nominal repetition.

In some examples, to support receiving the control signaling, the control signaling manager 1125 may be configured as or otherwise support a means for receiving a first control message scheduling the set of multiple repetitions of the uplink message and a second control message indicating the time gap threshold.

In some examples, the control signaling includes radio resource control signaling.

In some examples, the control signaling includes downlink control information.

Figure 12:
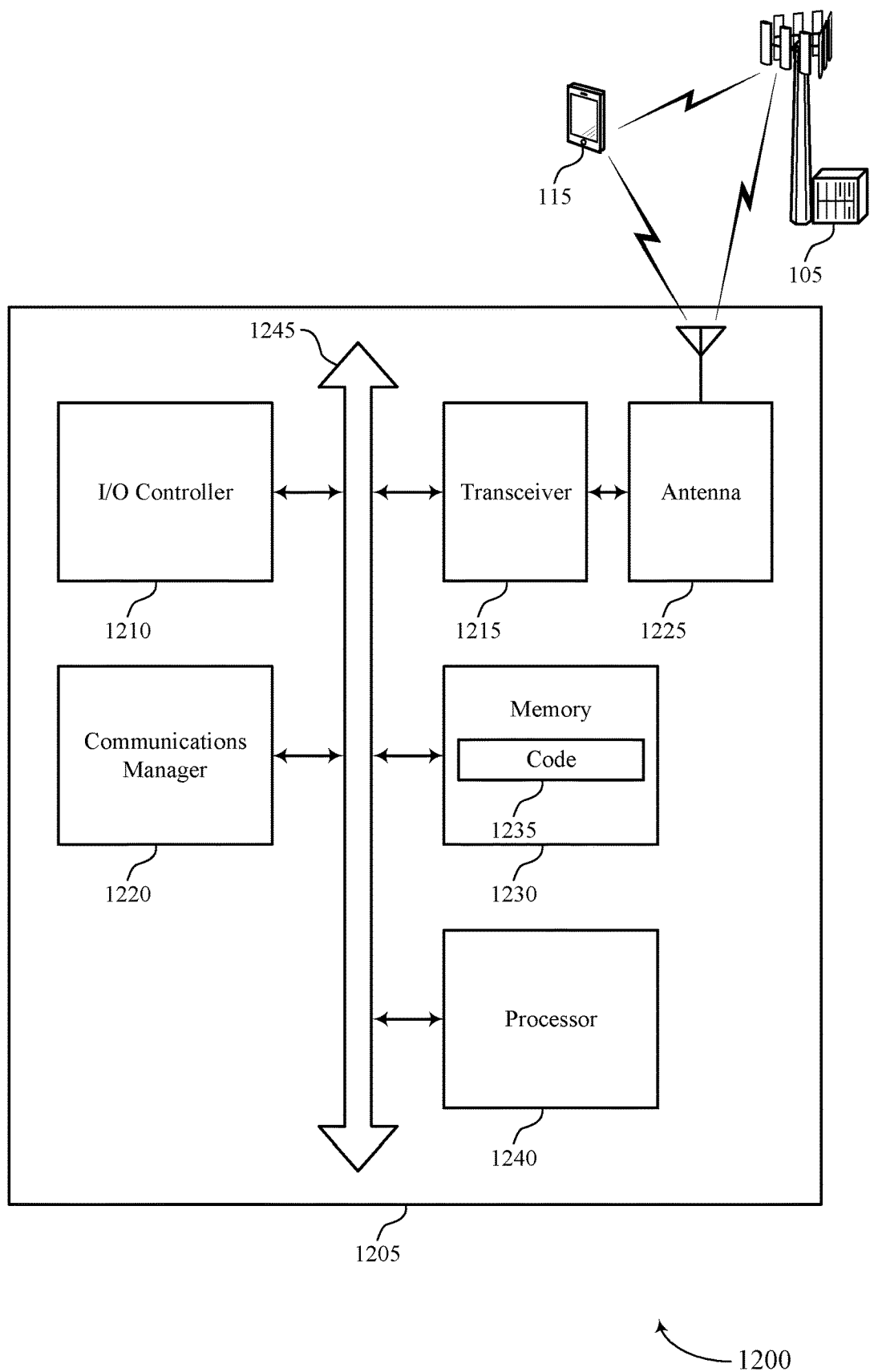
FIG. 12 shows a diagram of a system including a device that supports time gap enhancement for message repetition in accordance with examples as disclosed herein.

FIG. 12 shows a diagram of a system 1200 including a device 1205 that supports time gap enhancement for message repetition in accordance with examples as disclosed herein. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting time gap enhancement for message repetition). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving control signaling scheduling transmission of a set of multiple repetitions of an uplink message and indicating a time gap threshold between at least one pair of adjacent repetitions. The communications manager 1220 may be configured as or otherwise support a means for transmitting a first repetition of the uplink message based on the control signaling. The communications manager 1220 may be configured as or otherwise support a means for transmitting, based on the control signaling, a second repetition of the uplink message separated in time from transmission of the first repetition of the uplink message by a time gap satisfying the time gap threshold.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, or improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of time gap enhancement for message repetition as described herein, or the processor 1240 and the memory 1230 may be otherwise configured to perform or support such operations.

Figure 13:
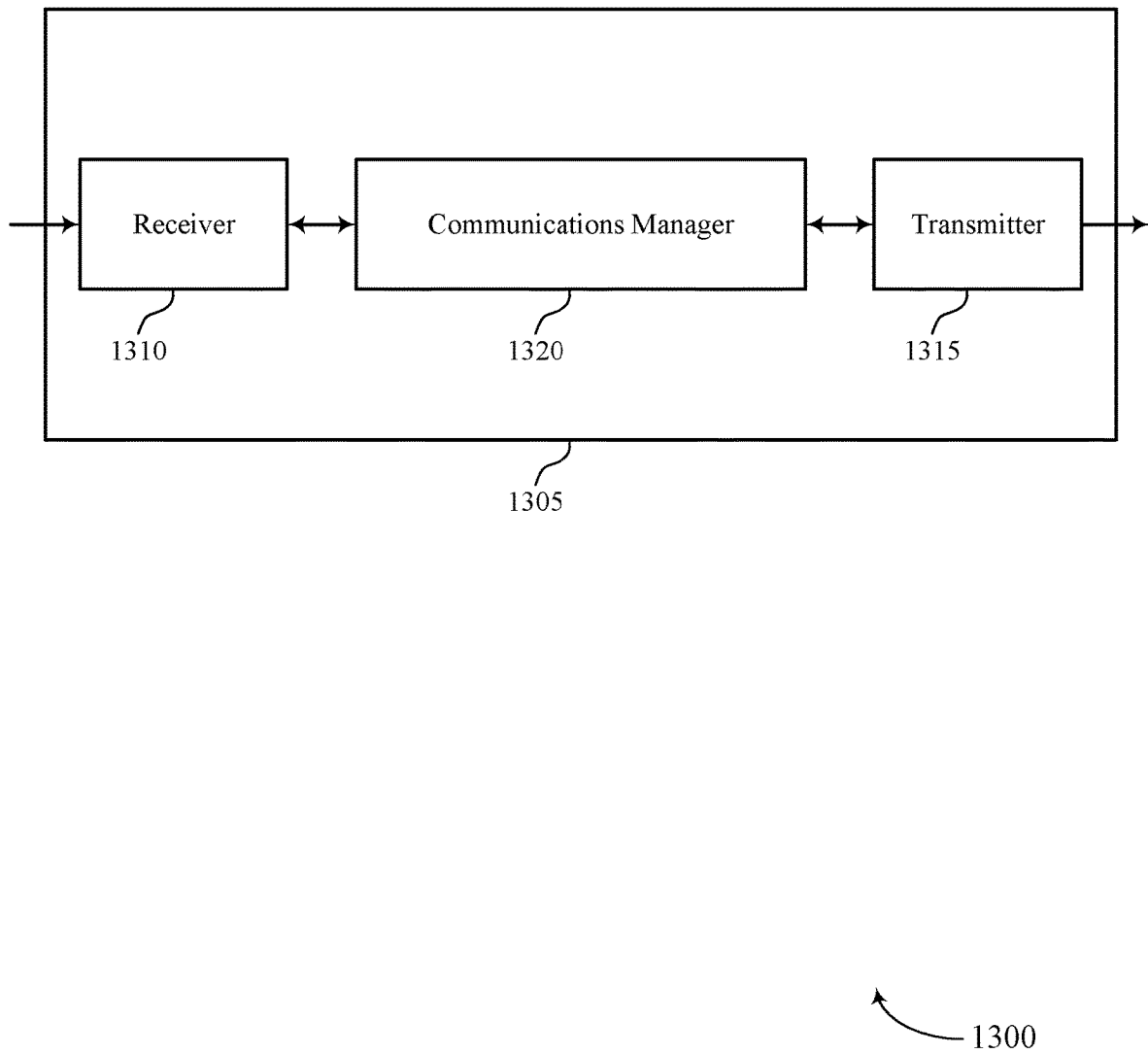
FIGS. 13 and 14 show block diagrams of devices that support time gap enhancement for message repetition in accordance with examples as disclosed herein.

FIG. 13 shows a block diagram 1300 of a device 1305 that supports time gap enhancement for message repetition in accordance with examples as disclosed herein. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to time gap enhancement for message repetition). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to time gap enhancement for message repetition). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of time gap enhancement for message repetition as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. For example, the communications manager 1320 may be configured as or otherwise support a means for transmitting control signaling scheduling transmission of a set of multiple repetitions of an uplink message and indicating a time gap threshold between at least one pair of adjacent repetitions. The communications manager 1320 may be configured as or otherwise support a means for receiving a first repetition of the uplink message based on the control signaling. The communications manager 1320 may be configured as or otherwise support a means for receiving, based on the control signaling, a second repetition of the uplink message separated in time from transmission of the first repetition of the uplink message by a time gap satisfying to the time gap threshold.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for reduced processing, reduced power consumption, or more efficient utilization of communication resources.

Figure 14:
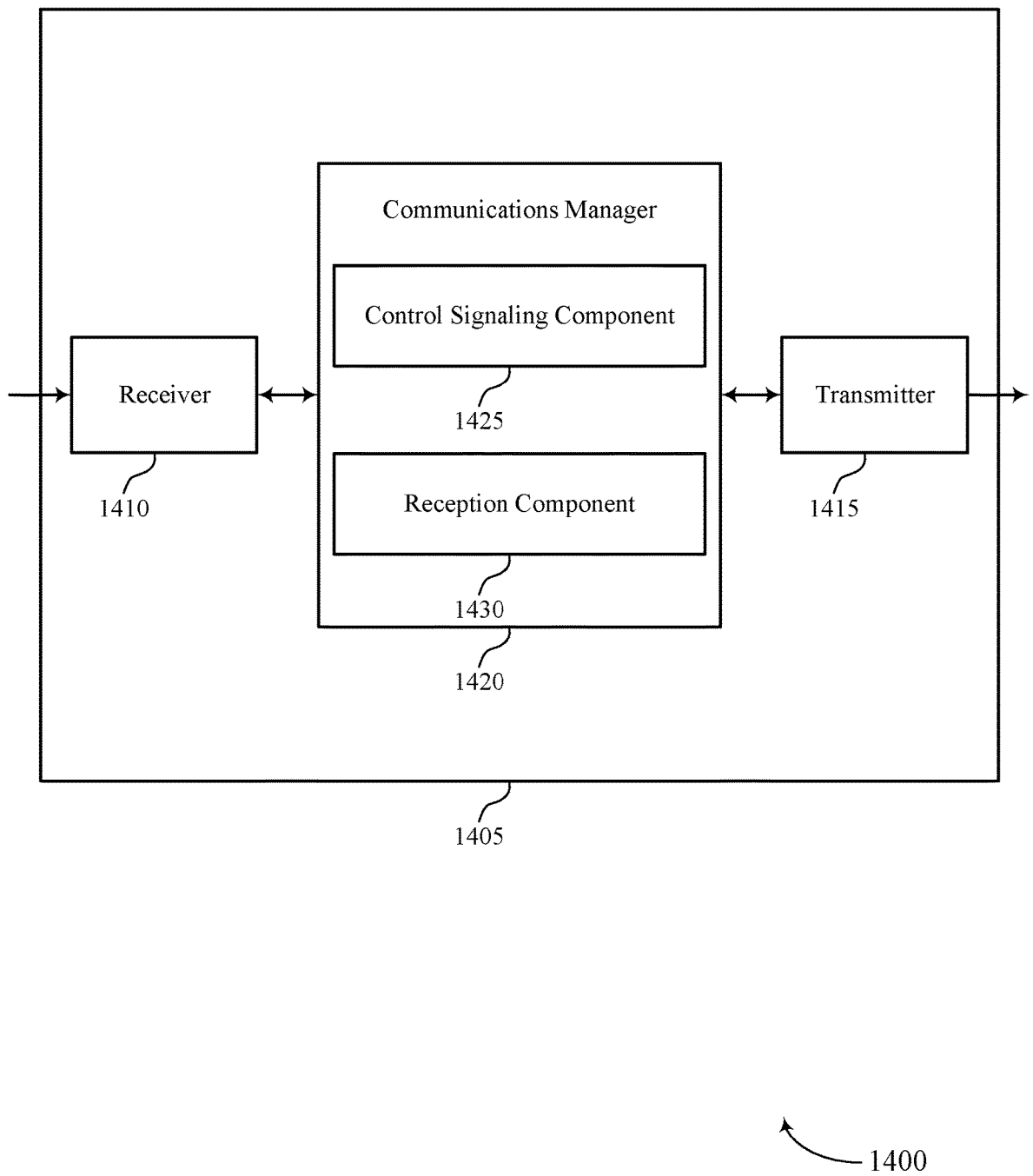

FIG. 14 shows a block diagram 1400 of a device 1405 that supports time gap enhancement for message repetition in accordance with examples as disclosed herein. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to time gap enhancement for message repetition). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to time gap enhancement for message repetition). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of time gap enhancement for message repetition as described herein. For example, the communications manager 1420 may include a control signaling component 1425 a reception component 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. The control signaling component 1425 may be configured as or otherwise support a means for transmitting control signaling scheduling transmission of a set of multiple repetitions of an uplink message and indicating a time gap threshold between at least one pair of adjacent repetitions. The reception component 1430 may be configured as or otherwise support a means for receiving a first repetition of the uplink message based on the control signaling. The reception component 1430 may be configured as or otherwise support a means for receiving, based on the control signaling, a second repetition of the uplink message separated in time from transmission of the first repetition of the uplink message by a time gap satisfying to the time gap threshold.

Figure 15:
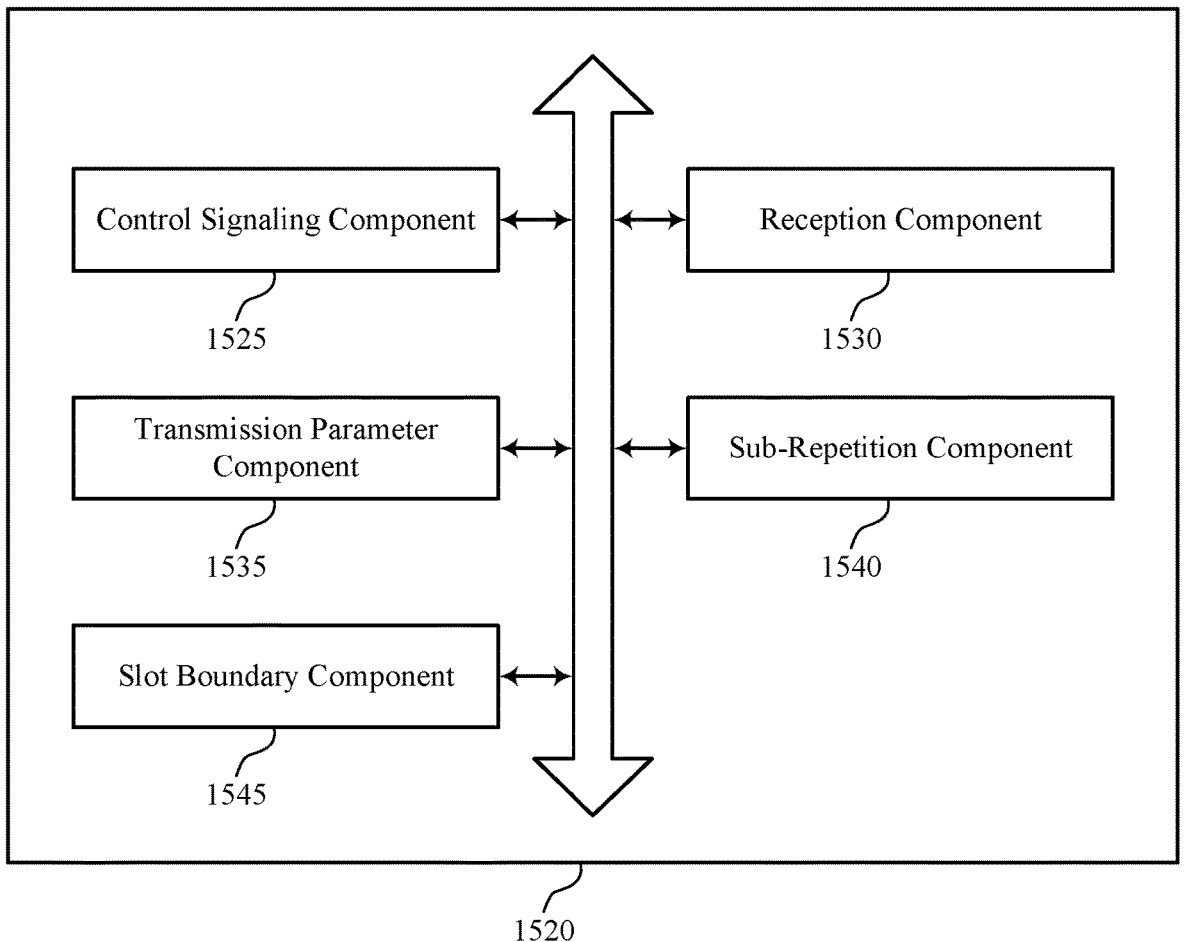
FIG. 15 shows a block diagram of a communications manager that supports time gap enhancement for message repetition in accordance with examples as disclosed herein.

FIG. 15 shows a block diagram 1500 of a communications manager 1520 that supports time gap enhancement for message repetition in accordance with examples as disclosed herein. The communications manager 1520 may be an example of aspects of a communications manager 1320, a communications manager 1420, or both, as described herein. The communications manager 1520, or various components thereof, may be an example of means for performing various aspects of time gap enhancement for message repetition as described herein. For example, the communications manager 1520 may include a control signaling component 1525, a reception component 1530, a transmission parameter component 1535, a sub-repetition component 1540, a slot boundary component 1545, or any combination thereof. Each of these components may communicate, directly or indirectly, with one another (e.g., via one or more buses).

The communications manager 1520 may support wireless communication at a base station in accordance with examples as disclosed herein. The control signaling component 1525 may be configured as or otherwise support a means for transmitting control signaling scheduling transmission of a set of multiple repetitions of an uplink message and indicating a time gap threshold between at least one pair of adjacent repetitions. The reception component 1530 may be configured as or otherwise support a means for receiving a first repetition of the uplink message based on the control signaling. In some examples, the reception component 1530 may be configured as or otherwise support a means for receiving, based on the control signaling, a second repetition of the uplink message separated in time from transmission of the first repetition of the uplink message by a time gap satisfying to the time gap threshold.

In some examples, to support receiving the first and second repetitions of the uplink message, the reception component 1530 may be configured as or otherwise support a means for receiving one or more repetitions of the uplink message having the time gap between one or more pairs of consecutive repetitions of the plurality of repetitions.

In some examples, to support receiving the second repetition of the uplink message, the transmission parameter component 1535 may be configured as or otherwise support a means for receiving the second repetition of the uplink message separated in time from reception of the first repetition of the uplink message by the time gap based on a first transmission parameter configured for transmission of the first repetition of the uplink message differing from a second transmission parameter configured for transmission of the second repetition of the uplink message.

In some examples, to support transmitting the control signaling, the control signaling component 1525 may be configured as or otherwise support a means for transmitting the control signaling indicating the first transmission parameter that specifies a first uplink transmission beam for transmission of the first repetition of the uplink message and the second transmission parameter that specifies a second uplink transmission beam for transmission of the second repetition of the uplink message that differs from the first uplink transmission beam.

In some examples, to support transmitting the control signaling, the control signaling component 1525 may be configured as or otherwise support a means for transmitting the control signaling indicating the first transmission parameter that specifies a first precoding indication for transmission of the first repetition of the uplink message and the second transmission parameter that specifies a second precoding indication for transmission of the second repetition of the uplink message that differs from the first precoding indication.

In some examples, to support transmitting the control signaling, the control signaling component 1525 may be configured as or otherwise support a means for transmitting the control signaling indicating the first transmission parameter that specifies a first power control parameter for transmission of the first repetition of the uplink message and the second transmission parameter that specifies a second power control parameter for transmission of the second repetition of the uplink message that differs from the first power control parameter.

In some examples, to support receiving the first repetition, the reception component 1530 may be configured as or otherwise support a means for receiving the first repetition of the uplink message within a first subset of resources indicated by the control signaling for the first repetition.

In some examples, to support receiving the first repetition of the uplink message, the reception component 1530 may be configured as or otherwise support a means for receiving the first repetition of the uplink message within a first subset of resources indicated by the control signaling for the first repetition, where the time gap corresponds to a second subset of resources indicated by the control signaling for the first repetition.

In some examples, to support receiving the second repetition, the reception component 1530 may be configured as or otherwise support a means for receiving the second repetition of the uplink message within a first subset of resources indicated by the control signaling for the second repetition.

In some examples, to support receiving the second repetition of the uplink message, the reception component 1530 may be configured as or otherwise support a means for receiving the second repetition of the uplink message within a first subset of resources indicated by the control signaling for the second repetition, where the time gap corresponds to a second subset of resources indicated by the control signaling for the second repetition.

In some examples, receiving the first repetition includes receiving the first repetition of the uplink message within a first subset of resources indicated by the control signaling for the first repetition. In some examples, receiving the second repetition includes receiving the second repetition of the uplink message within a first subset of resources indicated by the control signaling for the second repetition.

In some examples, one or more of the uplink message repetitions are associated with a corresponding transmission parameter.

In some examples, the first repetition is a first sub-repetition of a third repetition of the set of multiple repetitions and the second repetition is a second sub-repetition of the third repetition.

In some examples, the sub-repetition component 1540 may be configured as or otherwise support a means for where the first sub-repetition is a first actual repetition and the second sub-repetition is a second actual repetition.

In some examples, to support receiving the first sub-repetition of the uplink message, the sub-repetition component 1540 may be configured as or otherwise support a means for receiving the first sub-repetition of the uplink message within a first subset of resources indicated by the control signaling for the first sub-repetition based on a configured gap between the first sub-repetition and the second sub-repetition.

In some examples, to support receiving the second sub-repetition of the uplink message, the sub-repetition component 1540 may be configured as or otherwise support a means for receiving the second sub-repetition of the uplink message within a first subset of resources indicated by the control signaling for the second sub-repetition based on a configured gap between the first sub-repetition and the second sub-repetition.

In some examples, receiving the first repetition includes receiving the first repetition of the uplink message within a first subset of resources indicated by the control signaling for the first repetition based on the first subset of resources indicated by the control signaling for the first repetition crossing a slot boundary. In some examples, receiving the second repetition includes receiving the second repetition of the uplink message within a second subset of resources indicated by the control signaling for the first repetition that occurs after the slot boundary.

In some examples, the sub-repetition component 1540 may be configured as or otherwise support a means for identifying that the first repetition is a first sub-repetition and that the second repetition is a second sub-repetition. In some examples, the sub-repetition component 1540 may be configured as or otherwise support a means for where receiving the first repetition and the second repetition includes receiving the first sub-repetition, the second sub-repetition, or both, on a first subset and a second subset of resources indicated by the control signaling for the set of multiple repetitions, the first subset of resources separated in time by the time gap from the second subset of resources.

In some examples, the first repetition is a first nominal repetition and the second repetition is a second nominal repetition.

In some examples, to support transmitting the control signaling, the control signaling component 1525 may be configured as or otherwise support a means for transmitting a first control message scheduling the set of multiple repetitions of the uplink message and a second control message indicating the time gap threshold.

In some examples, the control signaling includes radio resource control signaling.

In some examples, the control signaling includes downlink control information.

Figure 16:
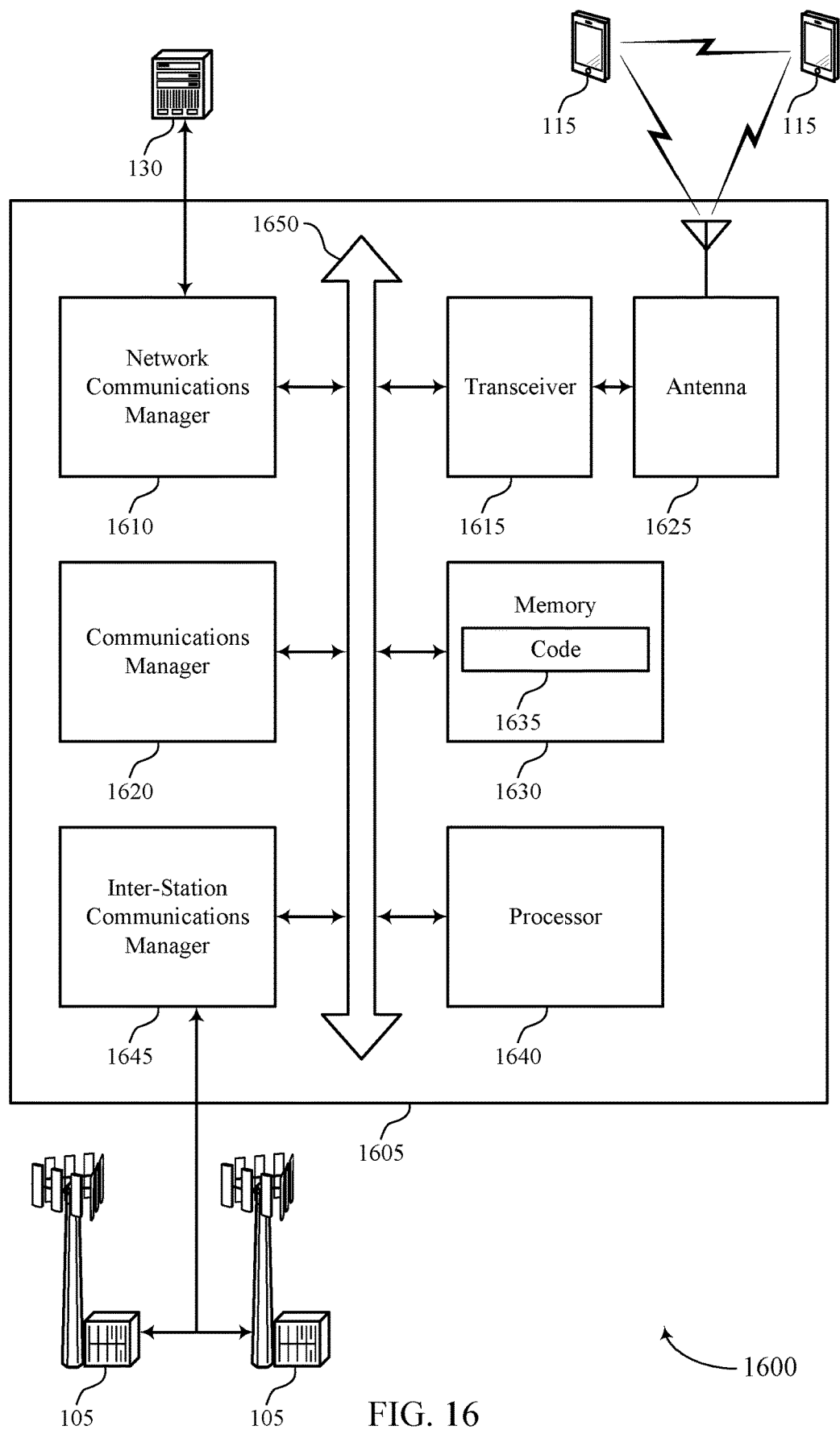
FIG. 16 shows a diagram of a system including a device that supports time gap enhancement for message repetition in accordance with examples as disclosed herein.

FIG. 16 shows a diagram of a system 1600 including a device 1605 that supports time gap enhancement for message repetition in accordance with examples as disclosed herein. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting time gap enhancement for message repetition). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105 and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a base station in accordance with examples as disclosed herein. For example, the communications manager 1620 may be configured as or otherwise support a means for transmitting control signaling scheduling transmission of a set of multiple repetitions of an uplink message and indicating a time gap threshold between at least one pair of adjacent repetitions. The communications manager 1620 may be configured as or otherwise support a means for receiving a first repetition of the uplink message based on the control signaling. The communications manager 1620 may be configured as or otherwise support a means for receiving, based on the control signaling, a second repetition of the uplink message separated in time from transmission of the first repetition of the uplink message by a time gap satisfying to the time gap threshold.

By including or configuring the communications manager 1620 in accordance with examples as described herein, the device 1605 may support techniques for improved communication reliability, reduced latency, improved user experience related to reduced processing, reduced power consumption, more efficient utilization of communication resources, improved coordination between devices, longer battery life, or improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of time gap enhancement for message repetition as described herein, or the processor 1640 and the memory 1630 may be otherwise configured to perform or support such operations.

Figure 17:
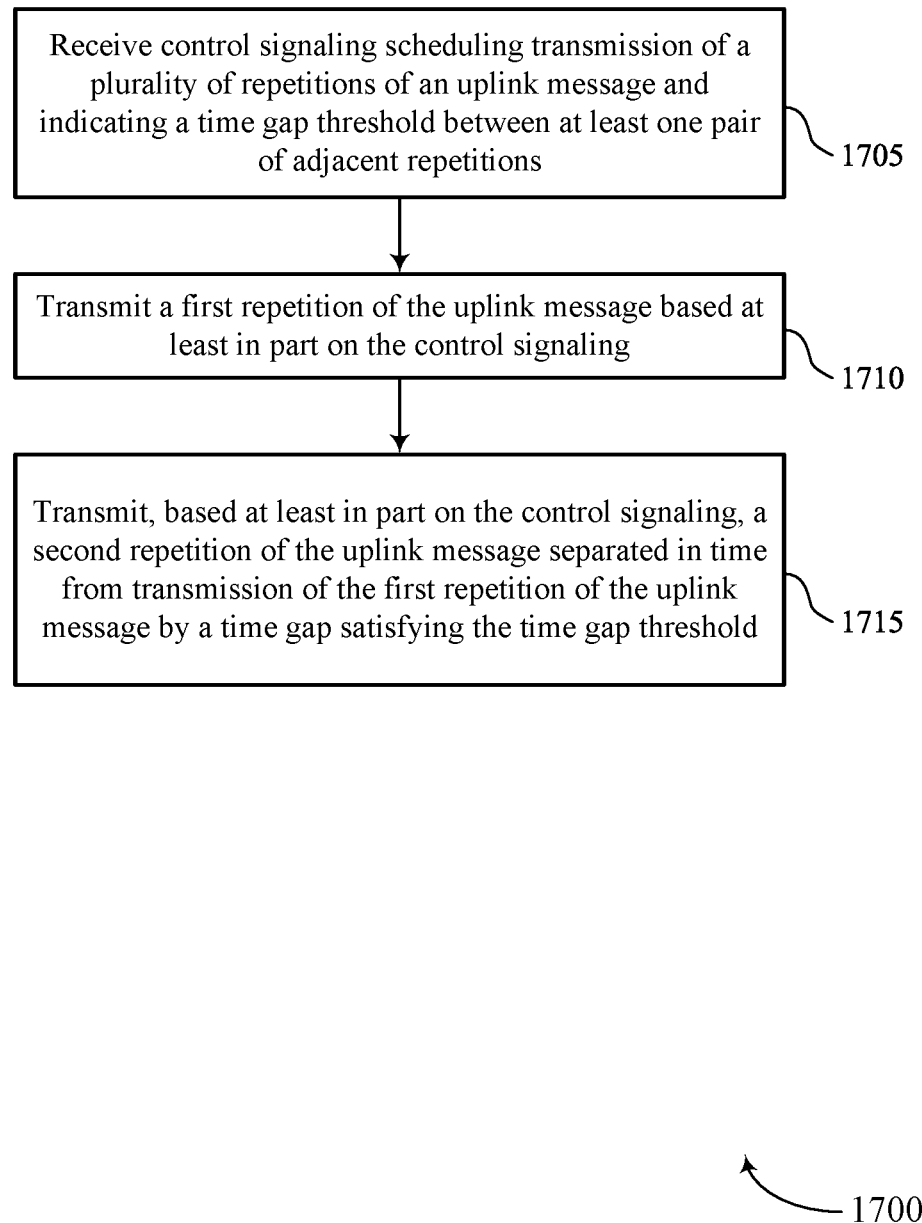
FIGS. 17 through 19 show flowcharts illustrating methods that support time gap enhancement for message repetition in accordance with examples as disclosed herein.

FIG. 17 shows a flowchart illustrating a method 1700 that supports time gap enhancement for message repetition in accordance with examples as disclosed herein. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving control signaling scheduling transmission of a set of multiple repetitions of an uplink message and indicating a time gap threshold between at least one pair of adjacent repetitions. The operations of 1705 may be performed in accordance with examples as disclosed herein. In some examples, aspects of the operations of 1705 may be performed by a control signaling manager 1125 as described with reference to FIG. 11.

At 1710, the method may include transmitting a first repetition of the uplink message based on the control signaling. The operations of 1710 may be performed in accordance with examples as disclosed herein. In some examples, aspects of the operations of 1710 may be performed by a transmission manager 1130 as described with reference to FIG. 11.

At 1715, the method may include transmitting, based on the control signaling, a second repetition of the uplink message separated in time from transmission of the first repetition of the uplink message by a time gap satisfying the time gap threshold. The operations of 1715 may be performed in accordance with examples as disclosed herein. In some examples, aspects of the operations of 1715 may be performed by a transmission manager 1130 as described with reference to FIG. 11.

Figure 18:
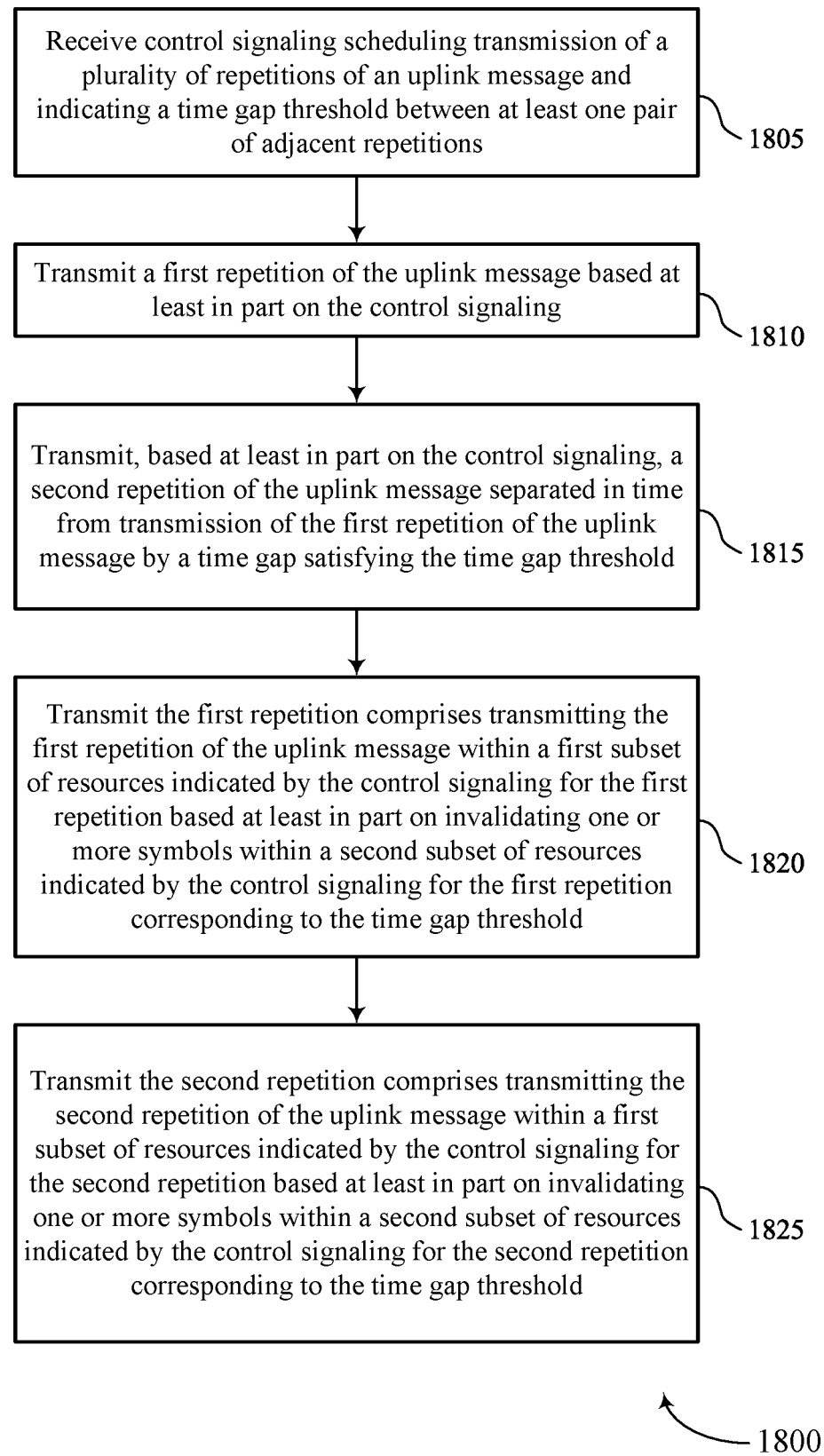

FIG. 18 shows a flowchart illustrating a method 1800 that supports time gap enhancement for message repetition in accordance with examples as disclosed herein. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving control signaling scheduling transmission of a set of multiple repetitions of an uplink message and indicating a time gap threshold between at least one pair of adjacent repetitions. The operations of 1805 may be performed in accordance with examples as disclosed herein. In some examples, aspects of the operations of 1805 may be performed by a control signaling manager 1125 as described with reference to FIG. 11.

At 1810, the method may include transmitting a first repetition of the uplink message based on the control signaling. The operations of 1810 may be performed in accordance with examples as disclosed herein. In some examples, aspects of the operations of 1810 may be performed by a transmission manager 1130 as described with reference to FIG. 11.

At 1815, the method may include transmitting, based on the control signaling, a second repetition of the uplink message separated in time from transmission of the first repetition of the uplink message by a time gap satisfying the time gap threshold. The operations of 1815 may be performed in accordance with examples as disclosed herein. In some examples, aspects of the operations of 1815 may be performed by a transmission manager 1130 as described with reference to FIG. 11.

At 1820, the method may include transmitting the first repetition includes transmitting the first repetition of the uplink message within a first subset of resources indicated by the control signaling for the first repetition based on invalidating one or more symbols within a second subset of resources indicated by the control signaling for the first repetition corresponding to the time gap threshold. The operations of 1820 may be performed in accordance with examples as disclosed herein. In some examples, aspects of the operations of 1820 may be performed by a transmission manager 1130 as described with reference to FIG. 11.

At 1825, the method may include transmitting the second repetition includes transmitting the second repetition of the uplink message within a first subset of resources indicated by the control signaling for the second repetition based on invalidating one or more symbols within a second subset of resources indicated by the control signaling for the second repetition corresponding to the time gap threshold. The operations of 1825 may be performed in accordance with examples as disclosed herein. In some examples, aspects of the operations of 1825 may be performed by a transmission manager 1130 as described with reference to FIG. 11.

Figure 19:
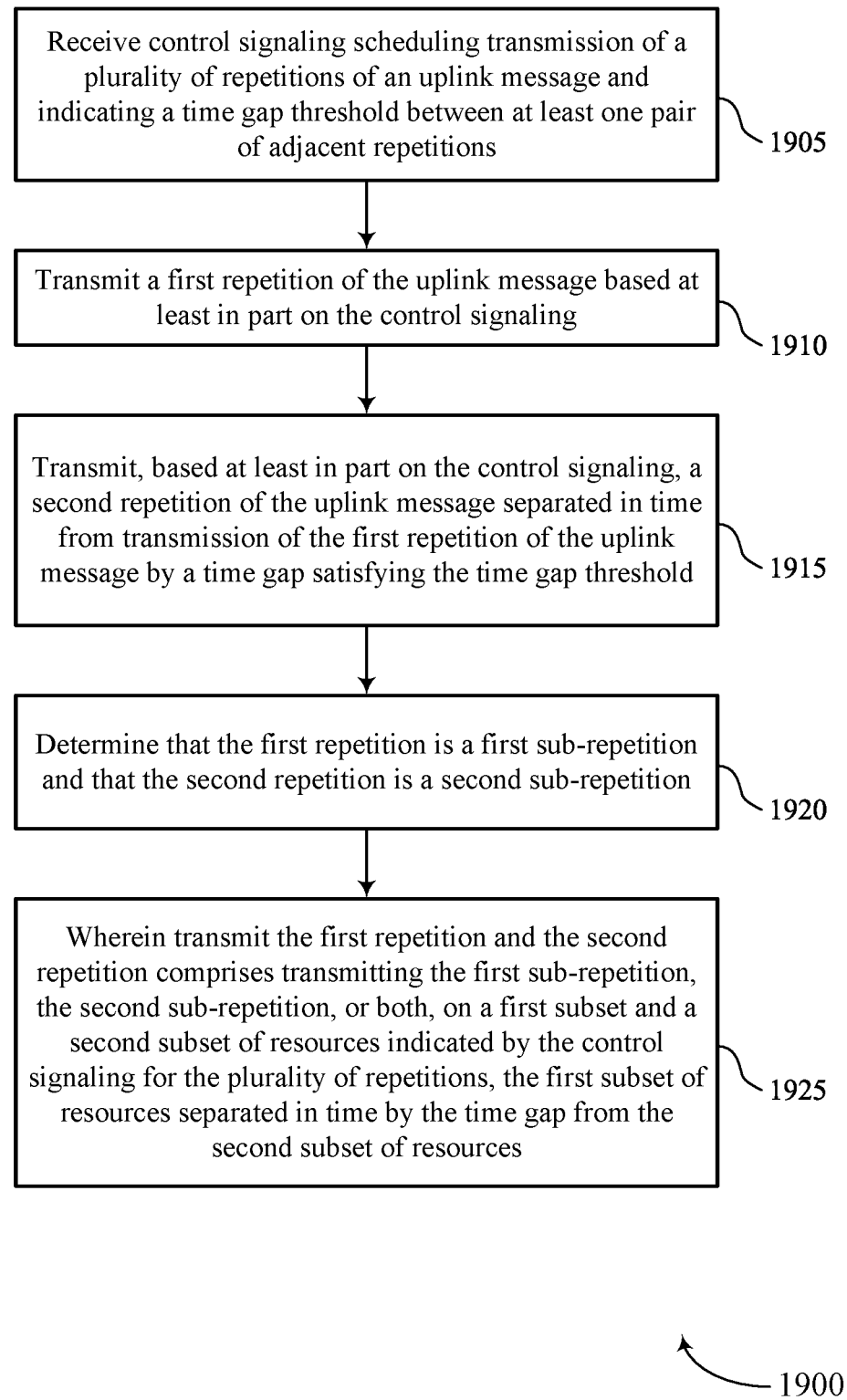

FIG. 19 shows a flowchart illustrating a method 1900 that supports time gap enhancement for message repetition in accordance with examples as disclosed herein. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving control signaling scheduling transmission of a set of multiple repetitions of an uplink message and indicating a time gap threshold between at least one pair of adjacent repetitions. The operations of 1905 may be performed in accordance with examples as disclosed herein. In some examples, aspects of the operations of 1905 may be performed by a control signaling manager 1125 as described with reference to FIG. 11.

At 1910, the method may include transmitting a first repetition of the uplink message based on the control signaling. The operations of 1910 may be performed in accordance with examples as disclosed herein. In some examples, aspects of the operations of 1910 may be performed by a transmission manager 1130 as described with reference to FIG. 11.

At 1915, the method may include transmitting, based on the control signaling, a second repetition of the uplink message separated in time from transmission of the first repetition of the uplink message by a time gap satisfying the time gap threshold. The operations of 1915 may be performed in accordance with examples as disclosed herein. In some examples, aspects of the operations of 1915 may be performed by a transmission manager 1130 as described with reference to FIG. 11.

At 1920, the method may include determining that the first repetition is a first sub-repetition and that the second repetition is a second sub-repetition. The operations of 1920 may be performed in accordance with examples as disclosed herein. In some examples, aspects of the operations of 1920 may be performed by a sub-repetition manager 1140 as described with reference to FIG. 11.

At 1925, the method may include where transmitting the first repetition and the second repetition includes transmitting the first sub-repetition, the second sub-repetition, or both, on a first subset and a second subset of resources indicated by the control signaling for the set of multiple repetitions, the first subset of resources separated in time by the time gap from the second subset of resources. The operations of 1925 may be performed in accordance with examples as disclosed herein. In some examples, aspects of the operations of 1925 may be performed by a sub-repetition manager 1140 as described with reference to FIG. 11.

The following provides an overview of aspects of the present disclosure:

Aspect 1: A method for wireless communication at a UE, comprising: receiving control signaling scheduling transmission of a plurality of repetitions of an uplink message and indicating a time gap threshold between at least one pair of adjacent repetitions; transmitting a first repetition of the uplink message based at least in part on the control signaling; and transmitting, based at least in part on the control signaling, a second repetition of the uplink message separated in time from transmission of the first repetition of the uplink message by a time gap satisfying the time gap threshold.

Aspect 2: The method of aspect 1, wherein transmitting the first and second repetitions of the uplink message comprises: transmitting each repetition of the uplink message having the time gap between each pair of consecutive repetitions of the plurality of repetitions.

Aspect 3: The method of any of aspects 1 through 2, wherein transmitting the second repetition of the uplink message comprises: transmitting the second repetition of the uplink message separated in time from transmission of the first repetition of the uplink message by the time gap based at least in part on a first transmission parameter configured for transmission of the first repetition of the uplink message differing from a second transmission parameter configured for transmission of the second repetition of the uplink message.

Aspect 4: The method of aspect 3, wherein receiving the control signaling comprises: receiving the control signaling indicating the first transmission parameter that specifies a first uplink transmission beam for transmission of the first repetition of the uplink message and the second transmission parameter that specifies a second uplink transmission beam for transmission of the second repetition of the uplink message that differs from the first uplink transmission beam.

Aspect 5: The method of any of aspects 3 through 4, wherein receiving the control signaling comprises: receiving the control signaling indicating the first transmission parameter that specifies a first precoding indication for transmission of the first repetition of the uplink message and the second transmission parameter that specifies a second precoding indication for transmission of the second repetition of the uplink message that differs from the first precoding indication.

Aspect 6: The method of any of aspects 3 through 5, wherein receiving the control signaling comprises: receiving the control signaling indicating the first transmission parameter that specifies a first power control parameter for transmission of the first repetition of the uplink message and the second transmission parameter that specifies a second power control parameter for transmission of the second repetition of the uplink message that differs from the first power control parameter.

Aspect 7: The method of any of aspects 1 through 6, wherein transmitting the first repetition of the uplink message comprises: transmitting the first repetition of the uplink message within a first subset of resources indicated by the control signaling for the first repetition, wherein the time gap corresponds to a second subset of resources indicated by the control signaling for the first repetition.

Aspect 8: The method of aspect 7, wherein transmitting the first repetition of the uplink message further comprises: transmitting the first repetition of the uplink message within a first subset of resources indicated by the control signaling for the first repetition based at least in part on invalidating one or more symbols within a second subset of resources indicated by the control signaling for the first repetition corresponding to the time gap threshold.

Aspect 9: The method of any of aspects 1 through 8, wherein transmitting the second repetition of the uplink message comprises: transmitting the second repetition of the uplink message within a first subset of resources indicated by the control signaling for the second repetition, wherein the time gap corresponds to a second subset of resources indicated by the control signaling for the second repetition.

Aspect 10: The method of aspect 9, wherein transmitting the second repetition of the uplink message further comprises: transmitting the second repetition of the uplink message within a first subset of resources indicated by the control signaling for the second repetition based at least in part on invalidating one or more symbols within a second subset of resources indicated by the control signaling for the second repetition corresponding to the time gap threshold.

Aspect 11: The method of any of aspects 1 through 10, wherein transmitting the first repetition comprises transmitting the first repetition of the uplink message within a first subset of resources indicated by the control signaling for the first repetition based at least in part on invalidating one or more symbols within a second subset of resources indicated by the control signaling for the first repetition corresponding to the time gap threshold; and transmitting the second repetition comprises transmitting the second repetition of the uplink message within a first subset of resources indicated by the control signaling for the second repetition based at least in part on invalidating one or more symbols within a second subset of resources indicated by the control signaling for the second repetition corresponding to the time gap threshold.

Aspect 12: The method of any of aspects 1 through 11, wherein one or more of the uplink message repetitions are associated with a corresponding transmission parameter.

Aspect 13: The method of any of aspects 1 through 12, wherein the first repetition is a first sub-repetition of a third repetition of the plurality of repetitions and the second repetition is a second sub-repetition of the third repetition.

Aspect 14: The method of aspect 13, further comprising: wherein the first sub-repetition is a first actual repetition and the second sub-repetition is a second actual repetition.

Aspect 15: The method of any of aspects 13 through 14, wherein transmitting the first sub-repetition of the uplink message comprises: identifying a configured gap between the first sub-repetition and the second sub-repetition; and transmitting the first sub-repetition of the uplink message within a first subset of resources indicated by the control signaling for the first sub-repetition based at least in part on the configured gap and invalidating one or more symbols within a second subset of resources indicated by the control signaling for the first sub-repetition corresponding to the time gap threshold.

Aspect 16: The method of any of aspects 13 through 15, wherein transmitting the second sub-repetition of the uplink message comprises: identifying a configured gap between the first sub-repetition and the second sub-repetition; and transmitting the second sub-repetition of the uplink message within a first subset of resources indicated by the control signaling for the second sub-repetition based at least in part on the configured gap and invalidating one or more symbols within a second subset of resources indicated by the control signaling for the second sub-repetition corresponding to the time gap threshold.

Aspect 17: The method of any of aspects 1 through 16, further comprising: transmitting the first repetition comprises transmitting the first repetition of the uplink message within a first subset of resources indicated by the control signaling for the first repetition based at least in part on the first subset of resources indicated by the control signaling for the first repetition crossing a slot boundary; and transmitting the second repetition comprises transmitting the second repetition of the uplink message within a second subset of resources indicated by the control signaling for the first repetition that occurs after the slot boundary.

Aspect 18: The method of any of aspects 1 through 17, further comprising: determining that the first repetition is a first sub-repetition and that the second repetition is a second sub-repetition; wherein transmitting the first repetition and the second repetition comprises transmitting the first sub-repetition, the second sub-repetition, or both, on a first subset and a second subset of resources indicated by the control signaling for the plurality of repetitions, the first subset of resources separated in time by the time gap from the second subset of resources.

Aspect 19: The method of any of aspects 1 through 18, wherein the first repetition is a first nominal repetition and the second repetition is a second nominal repetition.

Aspect 20: The method of any of aspects 1 through 19, wherein receiving the control signaling comprises: receiving a first control message scheduling the plurality of repetitions of the uplink message and a second control message indicating the time gap threshold.

Aspect 21: The method of any of aspects 1 through 20, wherein the control signaling comprises radio resource control signaling.

Aspect 22: The method of any of aspects 1 through 21, wherein the control signaling comprises downlink control information.

Aspect 23: A method for wireless communication at a base station, comprising: transmitting control signaling scheduling transmission of a plurality of repetitions of an uplink message and indicating a time gap threshold between at least one pair of adjacent repetitions; receiving a first repetition of the uplink message based at least in part on the control signaling; and receiving, based at least in part on the control signaling, a second repetition of the uplink message separated in time from transmission of the first repetition of the uplink message by a time gap satisfying to the time gap threshold.

Aspect 24: The method of aspect 23, wherein receiving the first and second repetitions of the uplink message comprises: receiving each repetition of the uplink message having the time gap between each pair of consecutive repetitions of the plurality of repetitions.

Aspect 25: The method of any of aspects 23 through 24, wherein receiving the second repetition of the uplink message comprises: receiving the second repetition of the uplink message separated in time from reception of the first repetition of the uplink message by the time gap based at least in part on a first transmission parameter configured for transmission of the first repetition of the uplink message differing from a second transmission parameter configured for transmission of the second repetition of the uplink message.

Aspect 26: The method of aspect 25, wherein transmitting the control signaling comprises: transmitting the control signaling indicating the first transmission parameter that specifies a first uplink transmission beam for transmission of the first repetition of the uplink message and the second transmission parameter that specifies a second uplink transmission beam for transmission of the second repetition of the uplink message that differs from the first uplink transmission beam.

Aspect 27: The method of any of aspects 25 through 26, wherein transmitting the control signaling comprises: transmitting the control signaling indicating the first transmission parameter that specifies a first precoding indication for transmission of the first repetition of the uplink message and the second transmission parameter that specifies a second precoding indication for transmission of the second repetition of the uplink message that differs from the first precoding indication.

Aspect 28: The method of any of aspects 25 through 27, wherein transmitting the control signaling comprises: transmitting the control signaling indicating the first transmission parameter that specifies a first power control parameter for transmission of the first repetition of the uplink message and the second transmission parameter that specifies a second power control parameter for transmission of the second repetition of the uplink message that differs from the first power control parameter.

Aspect 29: The method of any of aspects 23 through 28, wherein receiving the first repetition comprises: receiving the first repetition of the uplink message within a first subset of resources indicated by the control signaling for the first repetition.

Aspect 30: The method of aspect 29, wherein receiving the first repetition of the uplink message further comprises: receiving the first repetition of the uplink message within a first subset of resources indicated by the control signaling for the first repetition, wherein the time gap corresponds to a second subset of resources indicated by the control signaling for the first repetition.

Aspect 31: The method of any of aspects 23 through 30, wherein receiving the second repetition comprises: receiving the second repetition of the uplink message within a first subset of resources indicated by the control signaling for the second repetition.

Aspect 32: The method of aspect 31, wherein receiving the second repetition of the uplink message further comprises: receiving the second repetition of the uplink message within a first subset of resources indicated by the control signaling for the second repetition, wherein the time gap corresponds to a second subset of resources indicated by the control signaling for the second repetition.

Aspect 33: The method of any of aspects 23 through 32, wherein receiving the first repetition comprises receiving the first repetition of the uplink message within a first subset of resources indicated by the control signaling for the first repetition; and receiving the second repetition comprises receiving the second repetition of the uplink message within a first subset of resources indicated by the control signaling for the second repetition.

Aspect 34: The method of any of aspects 23 through 33, wherein one or more of the uplink message repetitions are associated with a corresponding transmission parameter.

Aspect 35: The method of any of aspects 23 through 34, wherein the first repetition is a first sub-repetition of a third repetition of the plurality of repetitions and the second repetition is a second sub-repetition of the third repetition.

Aspect 36: The method of aspect 35, further comprising: wherein the first sub-repetition is a first actual repetition and the second sub-repetition is a second actual repetition.

Aspect 37: The method of any of aspects 35 through 36, wherein receiving the first sub-repetition of the uplink message comprises: receiving the first sub-repetition of the uplink message within a first subset of resources indicated by the control signaling for the first sub-repetition based at least in part on a configured gap between the first sub-repetition and the second sub-repetition.

Aspect 38: The method of any of aspects 35 through 37, wherein receiving the second sub-repetition of the uplink message comprises: receiving the second sub-repetition of the uplink message within a first subset of resources indicated by the control signaling for the second sub-repetition based at least in part on a configured gap between the first sub-repetition and the second sub-repetition.

Aspect 39: The method of any of aspects 23 through 38, wherein receiving the first repetition comprises receiving the first repetition of the uplink message within a first subset of resources indicated by the control signaling for the first repetition based at least in part on the first subset of resources indicated by the control signaling for the first repetition crossing a slot boundary; and receiving the second repetition comprises receiving the second repetition of the uplink message within a second subset of resources indicated by the control signaling for the first repetition that occurs after the slot boundary.

Aspect 40: The method of any of aspects 23 through 39, further comprising: identifying that the first repetition is a first sub-repetition and that the second repetition is a second sub-repetition; wherein receiving the first repetition and the second repetition comprises receiving the first sub-repetition, the second sub-repetition, or both, on a first subset and a second subset of resources indicated by the control signaling for the plurality of repetitions, the first subset of resources separated in time by the time gap from the second subset of resources.

Aspect 41: The method of any of aspects 23 through 40, wherein the first repetition is a first nominal repetition and the second repetition is a second nominal repetition.

Aspect 42: The method of any of aspects 23 through 41, wherein transmitting the control signaling comprises: transmitting a first control message scheduling the plurality of repetitions of the uplink message and a second control message indicating the time gap threshold.

Aspect 43: The method of any of aspects 23 through 42, wherein the control signaling comprises radio resource control signaling.

Aspect 44: The method of any of aspects 23 through 43, wherein the control signaling comprises downlink control information.

Aspect 45: An apparatus for wireless communication at a UE, comprising a processor; memory coupled with the processor; and instructions stored in the memory and executable by the processor to cause the apparatus to perform a method of any of aspects 1 through 22.

Aspect 46: An apparatus for wireless communication at a UE, comprising at least one means for performing a method of any of aspects 1 through 22.

Aspect 47: A non-transitory computer-readable medium storing code for wireless communication at a UE, the code comprising instructions executable by a processor to perform a method of any of aspects 1 through 22.

Aspect 48: An apparatus for wireless communication at a base station, comprising a processor; memory coupled with the processor; and instructions stored in the memory and executable by the processor to cause the apparatus to perform a method of any of aspects 23 through 44.

Aspect 49: An apparatus for wireless communication at a base station, comprising at least one means for performing a method of any of aspects 23 through 44.

Aspect 50: A non-transitory computer-readable medium storing code for wireless communication at a base station, the code comprising instructions executable by a processor to perform a method of any of aspects 23 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving control signaling scheduling transmission of a plurality of repetitions of an uplink message and indicating a time gap threshold between at least one pair of adjacent repetitions, the control signaling indicating a first transmission parameter that specifies a first precoding indication for transmission of a first repetition of the uplink message and a second transmission parameter that specifies a second precoding indication for transmission of a second repetition of the uplink message that differs from the first precoding indication;
    transmitting the first repetition of the uplink message based at least in part on the control signaling; and
    transmitting, based at least in part on the control signaling and based at least in part on the first transmission parameter configured for transmission of the first repetition of the uplink message differing from the second transmission parameter configured for transmission of the second repetition of the uplink message, the second repetition of the uplink message separated in time from transmission of the first repetition of the uplink message by a time gap satisfying the time gap threshold.

2. The method of claim 1, wherein transmitting the first repetition and the second repetition of the uplink message comprises:
    transmitting one or more repetitions of the uplink message having the time gap between one or more pairs of consecutive repetitions of the plurality of repetitions.

3. The method of claim 1, wherein receiving the control signaling comprises:
    receiving the control signaling indicating the first transmission parameter that specifies a first uplink transmission beam for transmission of the first repetition of the uplink message and the second transmission parameter that specifies a second uplink transmission beam for transmission of the second repetition of the uplink message that differs from the first uplink transmission beam.

4. The method of claim 1, wherein receiving the control signaling comprises:
    receiving the control signaling indicating the first transmission parameter that specifies a first power control parameter for transmission of the first repetition of the uplink message and the second transmission parameter that specifies a second power control parameter for transmission of the second repetition of the uplink message that differs from the first power control parameter.

5. The method of claim 1, wherein transmitting the first repetition of the uplink message comprises:
    transmitting the first repetition of the uplink message within a first subset of resources indicated by the control signaling for the first repetition, wherein the time gap corresponds to a second subset of resources indicated by the control signaling for the first repetition.

6. The method of claim 5, wherein transmitting the first repetition of the uplink message further comprises:
    transmitting the first repetition of the uplink message within a first subset of resources indicated by the control signaling for the first repetition based at least in part on invalidating one or more symbols within a second subset of resources indicated by the control signaling for the first repetition corresponding to the time gap threshold.

7. The method of claim 1, wherein transmitting the second repetition of the uplink message comprises:
   transmitting the second repetition of the uplink message within a first subset of resources indicated by the control signaling for the second repetition, wherein the time gap corresponds to a second subset of resources indicated by the control signaling for the second repetition.

8. The method of claim 7, wherein transmitting the second repetition of the uplink message further comprises:
   transmitting the second repetition of the uplink message within a first subset of resources indicated by the control signaling for the second repetition based at least in part on invalidating one or more symbols within a second subset of resources indicated by the control signaling for the second repetition corresponding to the time gap threshold.

9. The method of claim 1, wherein:
   transmitting the first repetition comprises transmitting the first repetition of the uplink message within a first subset of resources indicated by the control signaling for the first repetition based at least in part on invalidating one or more symbols within a second subset of resources indicated by the control signaling for the first repetition corresponding to the time gap threshold; and
   transmitting the second repetition comprises transmitting the second repetition of the uplink message within a first subset of resources indicated by the control signaling for the second repetition based at least in part on invalidating one or more symbols within a second subset of resources indicated by the control signaling for the second repetition corresponding to the time gap threshold.

10. The method of claim 1, wherein one or more of the uplink message repetitions are associated with a corresponding transmission parameter.

11. The method of claim 1, wherein the first repetition is a first sub-repetition of a third repetition of the plurality of repetitions and the second repetition is a second sub-repetition of the third repetition.

12. The method of claim 11, further comprising:
   wherein the first sub-repetition is a first actual repetition and the second sub-repetition is a second actual repetition.

13. The method of claim 11, wherein transmitting the first sub-repetition of the uplink message comprises:
   identifying a configured gap between the first sub-repetition and the second sub-repetition; and
   transmitting the first sub-repetition of the uplink message within a first subset of resources indicated by the control signaling for the first sub-repetition based at least in part on the configured gap and invalidating one or more symbols within a second subset of resources indicated by the control signaling for the first sub-repetition corresponding to the time gap threshold.

14. The method of claim 11, wherein transmitting the second sub-repetition of the uplink message comprises:
   identifying a configured gap between the first sub-repetition and the second sub-repetition; and
   transmitting the second sub-repetition of the uplink message within a first subset of resources indicated by the control signaling for the second sub-repetition based at least in part on the configured gap and invalidating one or more symbols within a second subset of resources indicated by the control signaling for the second sub-repetition corresponding to the time gap threshold.

15. The method of claim 1, further comprising:
   transmitting the first repetition comprises transmitting the first repetition of the uplink message within a first subset of resources indicated by the control signaling for the first repetition based at least in part on the first subset of resources indicated by the control signaling for the first repetition crossing a slot boundary; and
   transmitting the second repetition comprises transmitting the second repetition of the uplink message within a second subset of resources indicated by the control signaling for the first repetition that occurs after the slot boundary.

16. The method of claim 1, further comprising:
   determining that the first repetition is a first sub-repetition and that the second repetition is a second sub-repetition;
   wherein transmitting the first repetition and the second repetition comprises transmitting the first sub-repetition, the second sub-repetition, or both, on a first subset of resources and a second subset of resources indicated by the control signaling for the plurality of repetitions, the first subset of resources separated in time by the time gap from the second subset of resources.

17. The method of claim 1, wherein the first repetition is a first nominal repetition and the second repetition is a second nominal repetition.

18. The method of claim 1, wherein receiving the control signaling comprises:
   receiving a first control message scheduling the plurality of repetitions of the uplink message and a second control message indicating the time gap threshold.

19. The method of claim 1, wherein the control signaling comprises radio resource control signaling.

20. The method of claim 1, wherein the control signaling comprises downlink control information.

21. A method for wireless communication at a network device, comprising:
   transmitting control signaling scheduling transmission of a plurality of repetitions of an uplink message and indicating a time gap threshold between at least one pair of adjacent repetitions, the control signaling indicating a first transmission parameter that specifies a first precoding indication for transmission of a first repetition of the uplink message and a second transmission parameter that specifies a second precoding indication for transmission of a second repetition of the uplink message that differs from the first precoding indication;
   receiving the first repetition of the uplink message based at least in part on the control signaling; and
   receiving, based at least in part on the control signaling and based at least in part on the first transmission parameter configured for transmission of the first repetition of the uplink message differing from the second transmission parameter configured for transmission of the second repetition of the uplink message, the second repetition of the uplink message separated in time from transmission of the first repetition of the uplink message by a time gap satisfying to the time gap threshold.

22. The method of claim 21, wherein receiving the first repetition and the second repetition of the uplink message comprises:

receiving one or more of the repetitions of the uplink message having the time ga between one or more pairs of consecutive repetitions of the plurality of repetitions.

23. The method of claim 21, wherein receiving the second repetition of the uplink message comprises:
receiving the second repetition of the uplink message separated in time from reception of the first repetition of the uplink message by the time gap based at least in part on a first transmission parameter configured for transmission of the first repetition of the uplink message differing from a second transmission parameter configured for transmission of the second repetition of the uplink message.

24. The method of claim 21, wherein receiving the first repetition comprises:
receiving the first repetition of the uplink message within a first subset of resources indicated by the control signaling for the first repetition.

25. The method of claim 21, wherein receiving the second repetition comprises:
receiving the second repetition of the uplink message within a first subset of resources indicated by the control signaling for the second repetition.

26. The method of claim 21, further comprising:
identifying that the first repetition is a first sub-repetition and that the second repetition is a second sub-repetition;
wherein receiving the first repetition and the second repetition comprises receiving the first sub-repetition, the second sub-repetition, or both, on a first subset of resources and a second subset of resources indicated by the control signaling for the plurality of repetitions, the first subset of resources separated in time by the time gap from the second subset of resources.

27. An apparatus for wireless communication at a user equipment (UE), comprising:
at least one processor;
memory coupled with the at least one processor; and
instructions stored in the memory and executable by the at least one processor to cause the apparatus to:
receive control signaling scheduling transmission of a plurality of repetitions of an uplink message and indicating a time gap threshold between at least one pair of adjacent repetitions, the control signaling indicating a first transmission parameter that specifies a first precoding indication for transmission of a first repetition of the uplink message and a second transmission parameter that specifies a second precoding indication for transmission of a second repetition of the uplink message that differs from the first precoding indication;
transmit the first repetition of the uplink message based at least in part on the control signaling; and
transmit, based at least in part on the control signaling and based at least in part on the first transmission parameter configured for transmission of the first repetition of the uplink message differing from the second transmission parameter configured for transmission of the second repetition of the uplink message, the second repetition of the uplink message separated in time from transmission of the first repetition of the uplink message by a time gap satisfying the time gap threshold.

28. An apparatus for wireless communication at a network device, comprising:
at least one processor;
memory coupled with the at least one processor; and
instructions stored in the memory and executable by the at least one processor to cause the apparatus to:
transmit control signaling scheduling transmission of a plurality of repetitions of an uplink message and indicating a time gap threshold between at least one pair of adjacent repetitions, the control signaling indicating a first transmission parameter that specifies a first precoding indication for transmission of a first repetition of the uplink message and a second transmission parameter that specifies a second precoding indication for transmission of a second repetition of the uplink message that differs from the first precoding indication;
receive the first repetition of the uplink message based at least in part on the control signaling; and
receive, based at least in part on the control signaling and based at least in part on the first transmission parameter configured for transmission of the first repetition of the uplink message differing from the second transmission parameter configured for transmission of the second repetition of the uplink message, the second repetition of the uplink message separated in time from transmission of the first repetition of the uplink message by a time gap satisfying to the time gap threshold.

* * * * *